(12) United States Patent  
Aoki et al.

(10) Patent No.: US 8,704,940 B2  
(45) Date of Patent: Apr. 22, 2014

(54) IMAGING DEVICE AND FOCUSING CONTROL METHOD

(71) Applicant: FUJIFILM Corporation, Tokyo (JP)

(72) Inventors: Takashi Aoki, Saitama (JP); Tomoki Inoue, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/966,859

(22) Filed: Aug. 14, 2013

(65) Prior Publication Data

US 2013/0329095 A1    Dec. 12, 2013

Related U.S. Application Data

(63) Continuation of application No. PCT/JP2011/078194, filed on Dec. 6, 2011.

(30) Foreign Application Priority Data

Mar. 31, 2011    (JP) ................................. 2011-080032

(51) Int. Cl.

| | | |
|---|---|---|
| *H04N 5/217* | (2011.01) | |
| *H04N 5/225* | (2006.01) | |
| *G03B 13/00* | (2006.01) | |
| *H04N 5/232* | (2006.01) | |
| *H04N 5/369* | (2011.01) | |

(52) U.S. Cl.
CPC ......... *H04N 5/3696* (2013.01); *H04N 5/23212* (2013.01)
USPC ............................ 348/345; 348/241; 348/340

(58) Field of Classification Search
CPC   H04N 5/3696; H04N 5/23212; H04N 5/3532
USPC .......................... 348/241, 242, 340, 345, 349
See application file for complete search history.

(56) References Cited

U.S. PATENT DOCUMENTS

| 8,284,295 B2 * | 10/2012 | Takahashi | 348/352 |
| 8,471,952 B2 * | 6/2013 | Awazu | 348/350 |
| 2008/0094482 A1 | 4/2008 | Yoshimura | |
| 2010/0091161 A1 | 4/2010 | Suzuki | |
| 2011/0096212 A1 * | 4/2011 | Oikawa | 348/273 |

FOREIGN PATENT DOCUMENTS

| JP | 2007-336314 A | 12/2007 |
| JP | 2008-072470 A | 3/2008 |
| JP | 2008-263352 A | 10/2008 |

(Continued)

*Primary Examiner* — Daniel M Pasiewicz

(74) *Attorney, Agent, or Firm* — Birch, Stewart, Kolasch & Birch, LLP

(57) ABSTRACT

An imaging device includes an image pick-up device including phase difference detection pixel pairs, each formed from a pair of phase difference detection pixels respectively having their openings eccentrically formed on opposite sides of a main axis of an imaging lens, and imaging pixel pairs; a reading section that reads out signals from the pixels arrayed in the image pick-up device using a rolling shutter method; a first correlation computation section that performs correlation computation on the signals from the phase difference detection pixel pairs; a second correlation computation section that performs correlation computation on the signals from the imaging pixel pairs; a correction section that corrects a result from the first correlation computation section using a result from the second correlation computation section; and a focusing section that performs focus control using the corrected result.

18 Claims, 18 Drawing Sheets

(56) References Cited

FOREIGN PATENT DOCUMENTS

| JP | 2008-312073 A | 12/2008 |
| JP | 2009-128579 A | 6/2009 |
| JP | 2010-008443 A | 1/2010 |
| JP | 2010-091991 A | 4/2010 |
| JP | 2010-147143 A | 7/2010 |

* cited by examiner

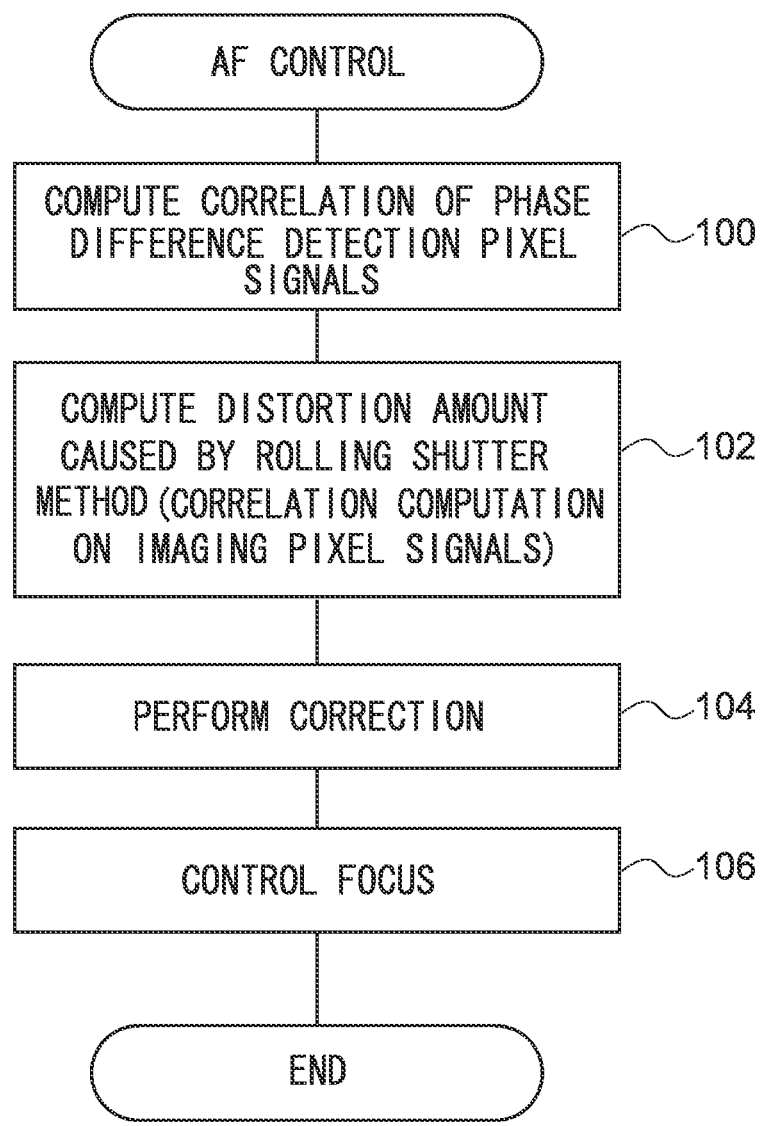

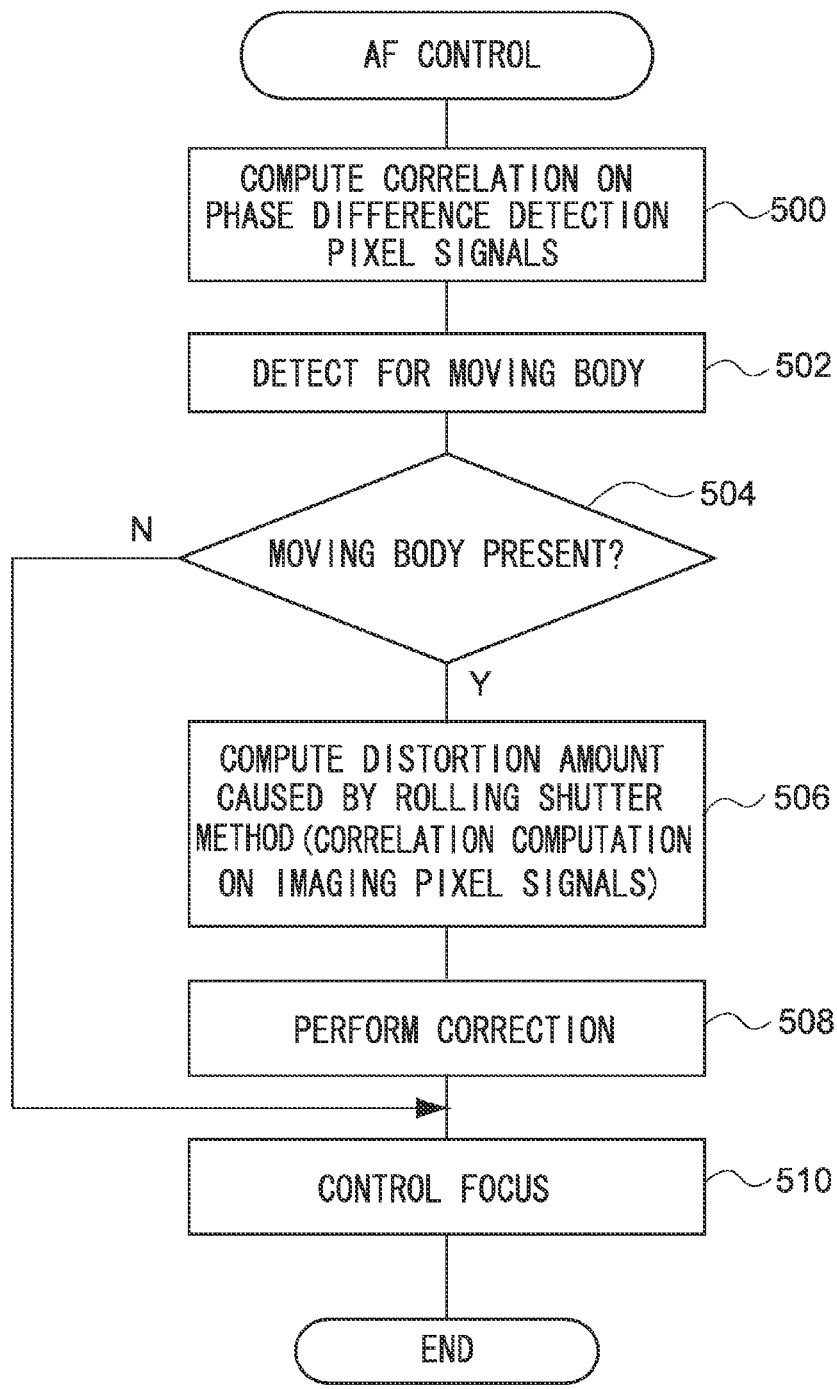

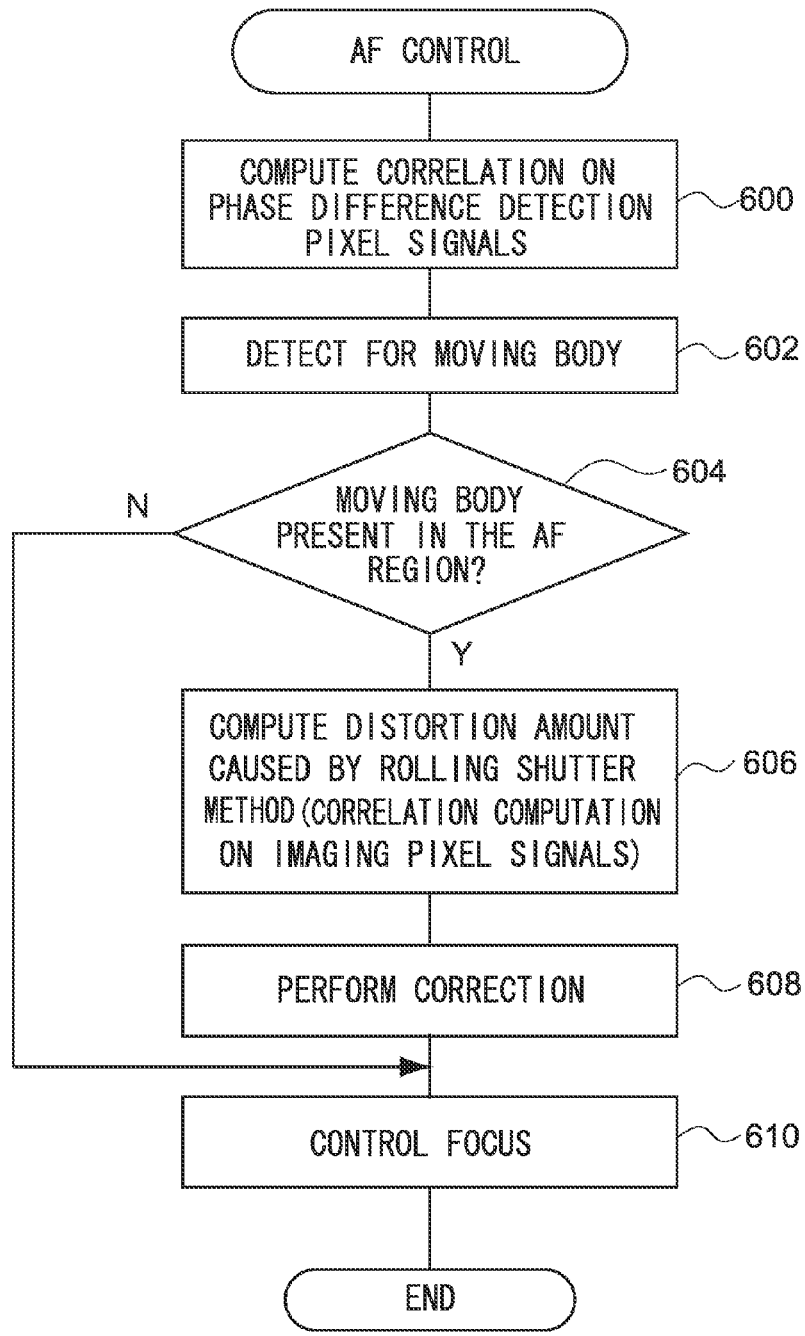

IMAGING DEVICE AND FOCUSING CONTROL METHOD

CROSS-REFERENCE TO RELATED APPLICATIONS

This application is a continuation application of International Application No. PCT/JP/2011/078194, filed on Dec. 6, 2011, the disclosure of which is incorporated herein by reference in its entirety. Further, this application claims priority over Japanese Patent Application No. 2011-080032, filed on Mar. 31, 2011, the disclosure of which is incorporated herein by reference in its entirety.

BACKGROUND OF THE INVENTION

1. Field of the Invention

The present invention relates to an imaging device and a focusing control method, and in particular to an imaging device and focusing control method that perform focus control during imaging of a subject.

2. Related Art

Recently, accompanying increasing resolution of solid state image pick-up devices such as Charge Coupled Device (CCD) area sensors and Complementary Metal Oxide Semiconductor (CMOS) image sensors, there is a rapid increase in demand for information equipment with imaging functions, such as digital electronic still cameras, digital video cameras, mobile phones, and Personal Digital Assistants (PDAs, mobile data terminals). Information equipment with imaging functions such as those described above will be referred to in general as imaging devices.

Focusing control methods for detecting the distance to a main subject include contrast methods and phase difference Auto Focus (AF) methods. Phase difference AF methods are often employed in various imaging devices due to being able to detect the in-focus position faster and at higher precision than with contrast methods.

A rolling shutter method in which sequential resetting and reading is performed from the upper sensors is known as a reading method used in imaging devices equipped with CMOS sensors. Since time differences arise in read timing according to the pixel position in a rolling shutter method, distortion may arise in an image of a subject in cases of moving subjects.

Therefore, in a case in which a phase difference AF method is used for focus control in an imaging devices equipped with CMOS sensors when imaging a moving subject, there is an influence from distortion caused by the rolling shutter method, and errors may arise in phase difference detection due to image movements or image changes that occur during shifted read timings.

Japanese Patent Application Laid-Open (JP-A) No. 2009-128579 discloses a device that, in cases in which a reliable focusing detection result has not been obtained by focus detection pixels disposed in a horizontal direction, performs focus detection with focus detection pixels disposed in a vertical direction, and in cases in which movement of the subject is detected, prevents the focus detection with the focus detection pixels disposed in the vertical direction.

JP-A No. 2008-72470 and JP-A No. 2008-263352 disclose devices that control the charge accumulation timing for pixels for phase difference detection to be the same time.

However, the technology disclosed in JP-A No. 2009-128579 is merely technology in which focus detection is only performed using a phase difference AF method under limited conditions, such as according to the reliability of a focus detection result or cases in which movement of the subject has not been detected, and is not capable of reducing the influence caused by a rolling shutter method performed during focus detection by phase difference AF method. Moreover, since the technology disclosed in JP-A No. 2008-72470 and JP-A No. 2008-263352 requires an additional circuit, it increases cost.

SUMMARY

In consideration of the above circumstances, the present invention provides an imaging device and a focusing control method that, even in cases in which detection of in-focus position is performed from signals that have been read from phase difference detection pixels disposed in different lines using a rolling shutter method, are capable of focus control that reduces the influence of distortion caused by the rolling shutter method and detects the in-focus position at high precision, without provision of an additional circuit.

A first aspect of the present invention is an imaging device including: an image pick-up device including plural phase difference detection pixel pairs, each formed from a first phase difference detection pixel having an opening eccentrically formed on one side with respect to a main axis of an imaging lens and a second phase difference detection pixel having an opening eccentrically formed on the other side with respect to the main axis, and plural imaging pixel pairs including plural imaging pixels; a reading section that performs read-out with respect to the image pick-up device by reading signals from the imaging pixels and the phase difference detection pixels arrayed in the image pick-up device using a rolling shutter method; a first correlation computation section that performs correlation computation on the signals that have been read from the phase difference detection pixel pairs; a second correlation computation section that performs correlation computation on the signals that have been read from the imaging pixel pairs; a correction section that corrects a correlation computation result from the first correlation computation section using a correlation computation result from the second correlation computation section; and a focusing section that performs focus control using the corrected correlation computation result.

Since the correlation computation result of the signals read from the phase difference detection pixel pairs is corrected with the correlation computation result of the signals read from the imaging pixel pairs, the influence of distortion caused by the rolling shutter method is reduced, and is it possible to perform in-focus position detection and focus control at high precision, without providing an additional circuit.

In the above aspect, the second correlation computation section may perform correlation computation on signals read from the plural imaging pixel pairs, each of which is formed from: an imaging pixel disposed on a line on which the first phase difference detection pixel of one of the plural phase difference detection pixel pairs is disposed, and an imaging pixel disposed on a line on which the second phase difference detection pixel of the one of the plural phase difference detection pixel pairs is disposed.

In the above aspect, the second correlation computation section may perform correlation computation on signals read from the plural imaging pixel pairs, each of which are formed from imaging pixels that are disposed on lines that are different from the lines on which the phase difference detection pixels of the plural phase difference detection pixel pairs are disposed.

In the above aspect, the second correlation computation section may perform correlation computation on signals read from the plural imaging pixel pairs provided with color filters of a same color as a color of color filters provided at the plural phase difference detection pixel pairs.

In the above aspect, the second correlation computation section may perform correlation computation on signals read from the plural imaging pixel pairs, which include an imaging pixel pair provided with color filters of a different color from a color of color filters provided at the plural phase difference detection pixel pairs.

In the above aspect, the plural imaging pixel pairs may include one or more imaging pixel pairs provided with R color filters, one or more imaging pixel pairs provided with G color filters, and one or more imaging pixel pairs provided with B color filters, and the second correlation computation section may perform correlation computation on signals that are read from one or more imaging pixel pairs of the plural imaging pixel pairs which are formed from imaging pixels provided with color filters of a color having a signal level closest to a signal level of the phase difference detection pixels forming the plural phase difference detection pixel pairs.

The above aspect may further include: a selection section that, prior to the correlation computation performed by the second correlation computation section, selects from the plural imaging pixel pairs, which include one or more imaging pixel pairs provided with R color filters, one or more imaging pixel pairs provided with G color filters and one or more imaging pixel pairs provided with B color filters, one or more imaging pixel pairs formed from imaging pixels provided with color filters of a color having a signal level closest to a signal level of the phase difference detection pixels forming the plural phase difference detection pixel pairs; and a control section that controls the reading section such that signals are respectively read from the plural phase difference detection pixel pairs and the one or more imaging pixel pairs selected by the selection section, wherein the second correlation computation section performs the correlation computation on the signals read under control of the control section.

The above aspect may further include an exposure control section that controls an exposure time of the image pick-up device such that an exposure amount corresponds to the sensitivity of the imaging pixels.

The above aspect may further include: a determination section that determines whether or not correction is to be performed by the correction section based on at least one of: a size of a focal region for focus matching, a number of the phase difference detection pixels from which signals used in correlation computation by the first correlation computation section are read out, movement of a subject within an image capture angle, or movement of a subject within the focal region, wherein, if the determination section determines that correction is not to be performed by the correction section, the focusing section prevents execution of the correction by the correction section and performs focus control using the correlation computation result from the first correlation computation section without correction.

Another aspect of the present invention is a focusing control method for an imaging device including an image pick-up device including plural phase difference detection pixel pairs each formed from a first phase difference detection pixel having an opening eccentrically formed on one side with respect to a main axis of an imaging lens and a second phase difference detection pixel having an opening eccentrically formed on the other side with respect to the main axis, and plural imaging pixel pairs including plural imaging pixels, the focusing control method including: performing reading-out to the image pick-up device by reading signals from the imaging pixels and the phase difference detection pixels arrayed in the image pick-up device using a rolling shutter method; performing a first correlation computation on the signals that have been read from the plural phase difference detection pixel pairs; performing a second correlation computation on the signals that have been read from the plural imaging pixel pairs; correcting a result of the first correlation computation using a result of the second correlation computation; and performing focus control using the corrected result of the correlation computations.

In the above aspect, the second correlation computation may include performing correlation computation on signals read from the plural imaging pixel pairs, each of which is formed from: an imaging pixel disposed on a line on which the first phase difference detection pixel of one of the plural phase difference detection pixel pairs is disposed, and an imaging pixel disposed on a line on which the second phase difference detection pixel of the one of the plural phase difference detection pixel pairs is disposed.

In the above aspect, the second correlation computation may include performing correlation computation on signals read from the plural imaging pixel pairs each formed from imaging pixels that are disposed on lines that are different from lines on which the phase difference detection pixels of the plural phase difference detection pixel pairs are disposed.

In the above aspect, the second correlation computation may include performing correlation computation on signals read from the plural imaging pixel pairs, which are provided with color filters of a same color as a color of color filters provided at the plural phase difference detection pixel pairs.

In the above aspect, the second correlation computation may include performing correlation computation on signals read from the plural imaging pixel pairs, which include an imaging pixel pair provided with color filters of a different color from a color of color filters provided at the plural phase difference detection pixel pairs.

In the above aspect, the plural imaging pixel pairs may include one or more imaging pixel pairs provided with R color filters, one or more imaging pixel pairs provided with G color filters, and one or more imaging pixel pairs provided with B color filters, and the second correlation computation may include performing correlation computation on signals that are read from one or more imaging pixel pairs of the plural imaging pixel pairs which are configured from imaging pixels provided with color filters of a color having a signal level closest to a signal level of the phase difference detection pixels forming the plural phase difference detection pixel pairs.

The above aspect may further include: prior to the second correlation computation, selecting from the plural imaging pixel pairs, which include one or more imaging pixel pairs provided with R color filters, one or more imaging pixel pairs provided with G color filters and one or more imaging pixel pairs provided with B color filters, one or more imaging pixel pairs formed from imaging pixels provided with color filters of a color having a signal level closest to a signal level of the phase difference detection pixels forming the plural phase difference detection pixel pairs; and controlling the reading such that signals are read from the plural phase difference detection pixel pairs and the selected one or more imaging pixel pairs, wherein the second correlation computation includes performing correlation computation on the read signals.

The above aspect may to further include controlling an exposure time of the image pick-up device such that an exposure amount corresponds to the sensitivity of the imaging pixels.

The above aspect may further include: determining whether or not correction is to be performed based on at least one of: a size of a focal region for focus matching, a number of the phase difference detection pixels from which signals used in the first correlation computation are read out, movement of a subject within an image capture angle, or movement of a subject within the focal region; and if it has determined that correction is not to be performed, preventing execution of correction and performing focus control using the result of the first correlation computation without correction.

Thus, since the correlation computation result of the signals read from the phase difference detection pixel pairs is corrected with the correlation computation result of the signals read from the imaging pixel pairs, the influence of distortion caused by the rolling shutter method is reduced, and it is possible to perform in-focus position detection and focus control at high precision, without providing an additional circuit.

BRIEF DESCRIPTION OF THE DRAWINGS

Exemplary embodiments of the present invention will be described in detail based on the following figures, wherein:

FIG. 6 is a flow chart illustrating a flow of AF control according to a first exemplary embodiment;

FIG. 16 is a flow chart illustrating another example of flow of AF control processing according to the second exemplary embodiment; and FIG. 17 is a flow chart illustrating another example of flow of AF control processing according to the second exemplary embodiment;

DETAILED DESCRIPTION

Hereinafter, explanation is given of embodiments in which the present invention is applied to a digital electronic still camera (called "digital camera" below) that performs imaging of a still image.

First Exemplary Embodiment

Figure 1:
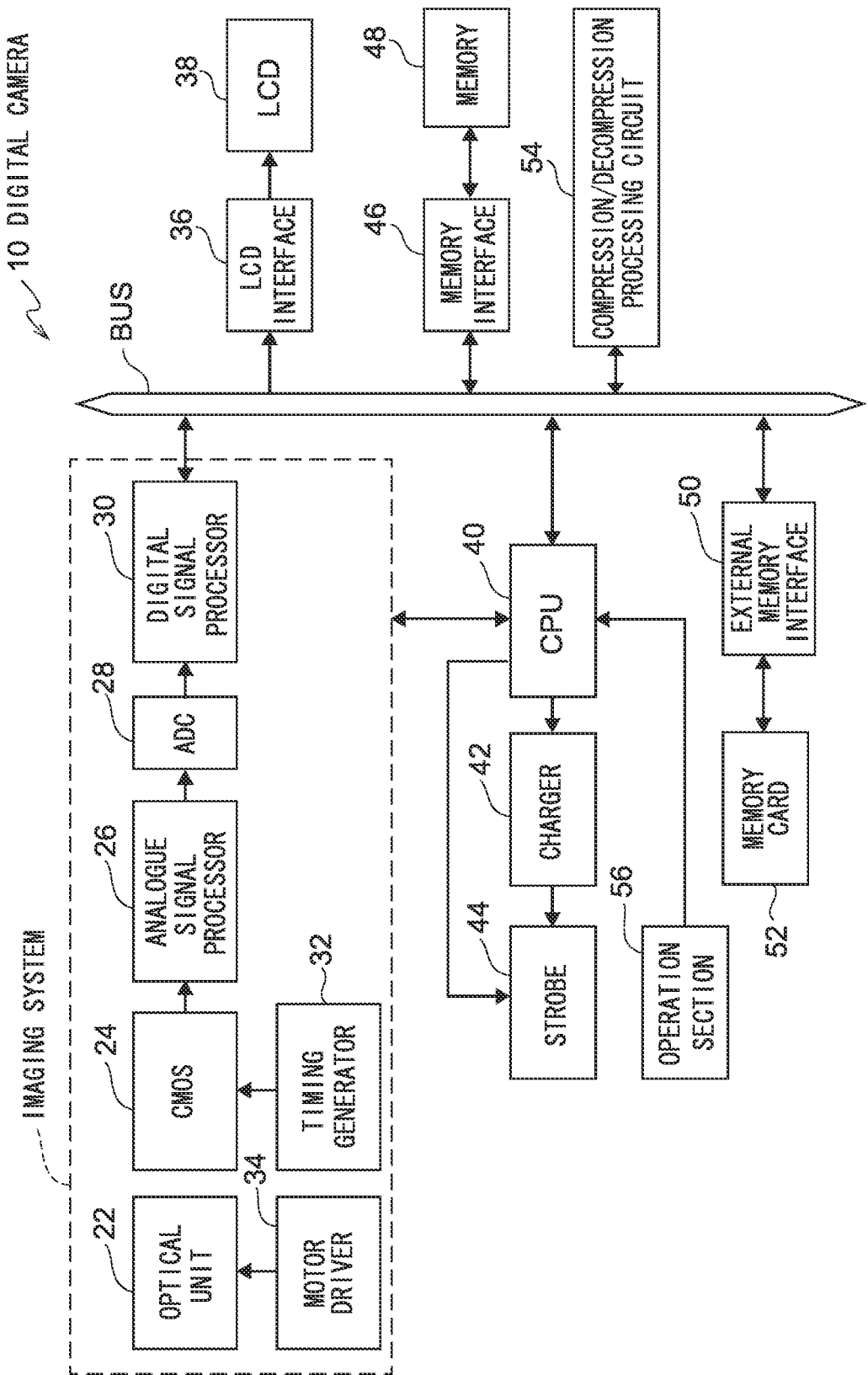
FIG. 1 is a block diagram illustrating relevant configuration of an electrical system of a digital camera according to an exemplary embodiment.

Firstly, explanation follows regarding relevant configuration of an electrical system of a digital camera 10 according to the present exemplary embodiment, with reference to FIG. 1.

As illustrated in FIG. 1, the digital camera 10 according to the present exemplary embodiment includes: an optical unit 22 including lenses for focusing a subject; a solid-state image pick-up device (a Complementary Metal Oxide Semiconductor (CMOS) in the present exemplary embodiment) 24 that is disposed downstream to the lenses and on the optical axis of the lenses; and an analogue signal processor 26 that performs various types of analogue signal processing on input analogue signals.

Moreover, the digital camera 10 includes: an analogue/digital converter (referred to below as ADC) 28 that converts input analogue signals into digital signals; and a digital signal processor 30 that performs various types of digital signal processing on input digital data.

The digital signal processor 30 is installed with a specific capacity of line buffer, and also performs control of directly storing input digital data in a specific region of a memory 48 that is described later.

The output terminal of the CMOS 24 is connected to the input terminal of the analogue signal processor 26, the output terminal of the analogue signal processor 26 is connected to the input terminal of the ADC 28, and the output terminal of the ADC 28 is connected to the input terminal of the digital signal processor 30. As a result, analogue signals expressing a subject image output from the CMOS 24 are subject to specific analogue signal processing by the analogue signal processor 26, and are input to the digital signal processor 30 after being converted into digital image data by the ADC 28.

The digital camera 10 also includes: a Liquid Crystal Display (referred to below as LCD) 38 that displays captured subject images, menu screens and the like; an LCD interface 36 that generates signals for displaying the captured subject images, menu screens and the like on the LCD 38, and supplies the signals to the LCD 38; a Central Processing Unit (CPU) 40 that controls the overall operation of the digital camera 10; the memory 48 that temporarily stores data such as digital image data obtained by imaging; and a memory interface 46 that performs access control for the memory 48.

Furthermore, the digital camera 10 includes: an external memory interface 50 for enabling access to a portable memory card 52 from the digital camera 10; and a compression/decompression processing circuit 54 that performs compression processing and decompression processing on digital image data.

In the digital camera 10 of the present exemplary embodiment, a flash memory (Flash Memory) is used as the memory 48, and an xD-Picture Card® is used as the memory card 52; however, embodiments are not limited thereto.

The digital signal processor 30, the LCD interface 36, the CPU 40, the memory interface 46, the external memory interface 50, and the compression/decompression processing circuit 54 are mutually connected together by a system bus BUS. Consequently, the CPU 40 is able to control operation of the digital signal processor 30 and the compression/decompression processing circuit 54, to display various data on the LCD 38 through the LCD interface 36, and to access the memory 48 and the memory card 52 through the memory interface 46 and the external memory interface 50, respectively. Further, the CPU 40 executes AF control, which is described later.

The digital camera 10 also includes a timing generator 32 that generates a timing signal (pulse signal) mainly for driving the CMOS 24 and supplies the timing signal to the CMOS 24. Driving of the CMOS 24 is controlled by the CPU 40 through the timing generator 32.

The CMOS 24 includes plural lines of plural pixels arrayed along the horizontal direction, as described later. The CMOS 24 is controlled by a rolling shutter method that controls an exposure start timing and a read timing for each of the lines of the pixels. In the following explanation an example is given of a case in which the exposure start timing and the read timing are different for each line; however, embodiments are not limited to this case.

The digital camera 10 also includes a motor driver 34. The CPU 40 controls driving of a focus adjustment motor, a zoom motor, and an aperture drive motor, which are not illustrated in the drawings, and are provided to the optical unit 22, through the motor driver 34.

The lenses according to the present exemplary embodiment include imaging lenses including a zoom lens and a focus lens, and the digital camera 10 is provided with a lens drive mechanism, which is not illustrated in the drawings. The focus adjustment motor, the zoom motor, and the aperture drive motor are included in the lens drive mechanism. These motors are respectively driven by drive signals supplied from the motor driver 34 under control of the CPU 40.

The digital camera 10 also includes an operation section 56 including various types of switch, such as: a release switch (called a shutter) that is pressed at execution of imaging; a power supply switch that is operated to switch ON/OFF of the power supply to the digital camera 10; a mode switching switch that is operated to set one of the modes of an imaging mode for performing imaging, or a reproduction mode for reproducing a subject on the LCD 38; a menu switch that is pressed to display menu screens on the LCD 38; a confirmation switch that is pressed to confirm previous operations; and a cancel switch that is pressed to cancel the last operation. The operation section 56 is connected to the CPU 40. Accordingly, the CPU 40 is able to continuously ascertain the operation state on the operation section 56.

The release switch of the digital camera 10 according to the present exemplary embodiment is configured to enable two-stage press-operation: a state that is being pressed down to an intermediate position (referred to below as "half-pressed state"); and a state that is being pressed down beyond the indented position to the lowermost depressed position (referred to below as "fully-pressed state").

In the digital camera 10, in response to the release switch being placed in the half-pressed state, an Automatic Exposure (AE) function is operated and the exposure state (the shutter speed, aperture state) is set, and then focus control is performed by operation of the AF function. Then, in response to the release switch being placed in the fully-pressed state, exposure (imaging) is performed.

The digital camera 10 also includes a strobe 44 that emits light to illuminate the subject as required during imaging, and a charger 42 that is interposed between the strobe 44 and the CPU 40 and that charges the strobe 44 with power for light emission under control of the CPU 40. The strobe 44 is also connected to the CPU 40, and light emission of the strobe 44 is controlled by the CPU 40.

Figure 2:
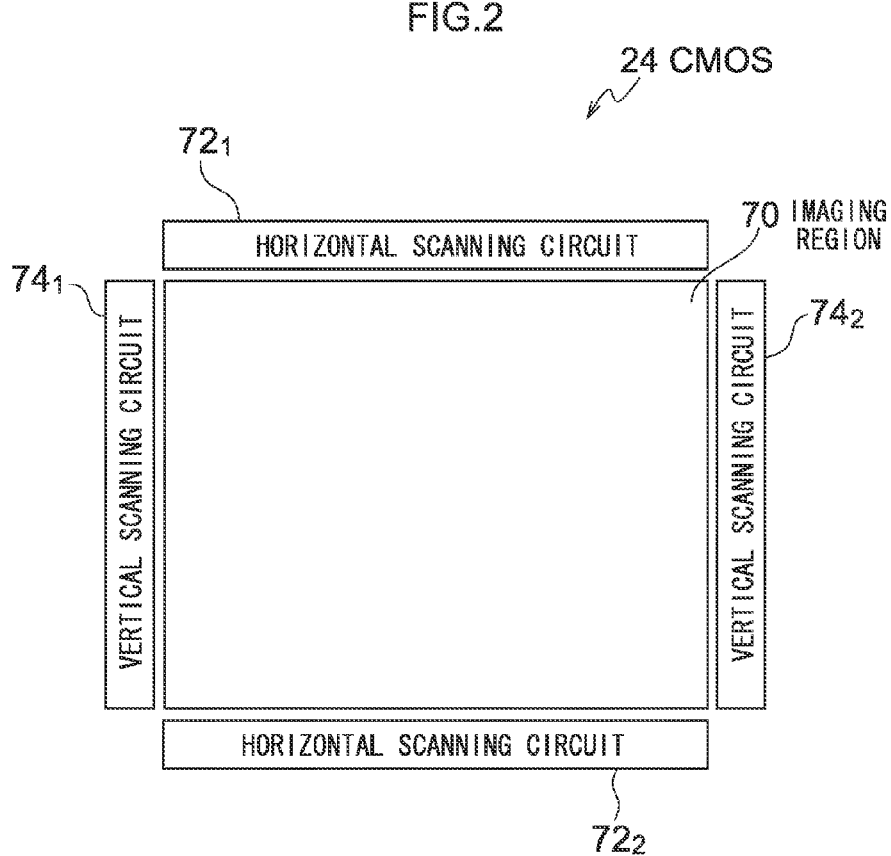
FIG. 2 is a plan view illustrating an overall configuration of a CMOS.

FIG. 2 is a plan view illustrating an overall configuration of the CMOS 24. An imaging region 70 of the CMOS 24 is formed by numerous pixels (light receiving elements, or photodiodes), which are not illustrated in the drawings, disposed in a two dimensional array formation. In the present exemplary embodiment, pixel arrays are arranged in a honeycomb arrangement, in which even-numbered pixel rows are shifted with respect to odd-numbered pixel rows by ½ the pixel pitch.

Further, although not illustrated in FIG. 2, in the present exemplary embodiment, color filters of red (R), green (G) and blue (B) are applied on each of the plural pixels of an imaging region 70 such that the pixels with different color layers are arranged in a Bayer arrangement. Alternatively, the arrangement of R, G, B color filters may be configured in a stripe arrangement.

The CMOS 24 is also provided with horizontal scanning circuits $72_1$, $72_2$ and vertical scanning circuits $74_1$, $74_2$ (corresponding to reading sections). While not illustrated in the drawings, horizontal signal lines are connected to the horizontal scanning circuits $72_1$, $72_2$, and vertical selection lines are connected to the vertical scanning circuits $74_1$, $74_2$.

The vertical scanning circuit $74_1$ selects, in row (line) units, each of the pixels of a first pixel group of odd-numbered rows disposed in the imaging region 70 using the vertical selection lines. The selection is performed by selecting the rows one by one in sequence from the lowermost row, and reading is performed for all the pixel signals in each row together at one time. A CDS circuit may be provided in order to reduce reset noise by performing correlated double sampling processing on each of the pixel signals read in row units from the first pixel group. The horizontal scanning circuit $72_1$ takes one row's worth of pixel signals read from the first pixel group and selects the pixels one by one in sequence from the left side. Each of the pixel signals read from the first pixel group is thereby output to the horizontal signal lines. The pixel signals sequentially output in this manner to the horizontal signal lines are amplified by an amplifier at the subsequent stage (not illustrated in the drawings) and then are output to external devices.

Further, the vertical scanning circuit $74_2$ selects each of the pixels of a second pixel group of even-numbered rows disposed in the imaging region 70 in row units using the vertical selection lines. The selection is performed by selecting the rows one by one in sequence from the lowermost row, and reading is performed for all the pixel signals of each row together at one time. A CDS circuit may be provided in order to reduce reset noise by performing correlated double sampling processing on each of the pixel signals read in row units from the second pixel group. The horizontal scanning circuit $72_2$ takes one row's worth of pixel signals read from the second pixel group and selects the pixels one by one in sequence from the left side. Each of the pixel signals read from the second pixel group is thereby output to the horizontal signal lines. The pixel signals sequentially output in this manner to the horizontal signal lines are amplified by an amplifier at the subsequent stage (not illustrated in the drawings) and then are output to external devices.

In the present exemplary embodiment, a rectangular shaped phase difference detection region is provided in a part of the imaging region 70, for example at a central position. The phase difference detection region may be provided only in one location of the imaging region 70, or may be provided at plural locations so that AF function can be performed anywhere within the imaging region 70. Alternatively, the entire region of the imaging region 70 may be configured as the phase difference detection region.

Figure 3:
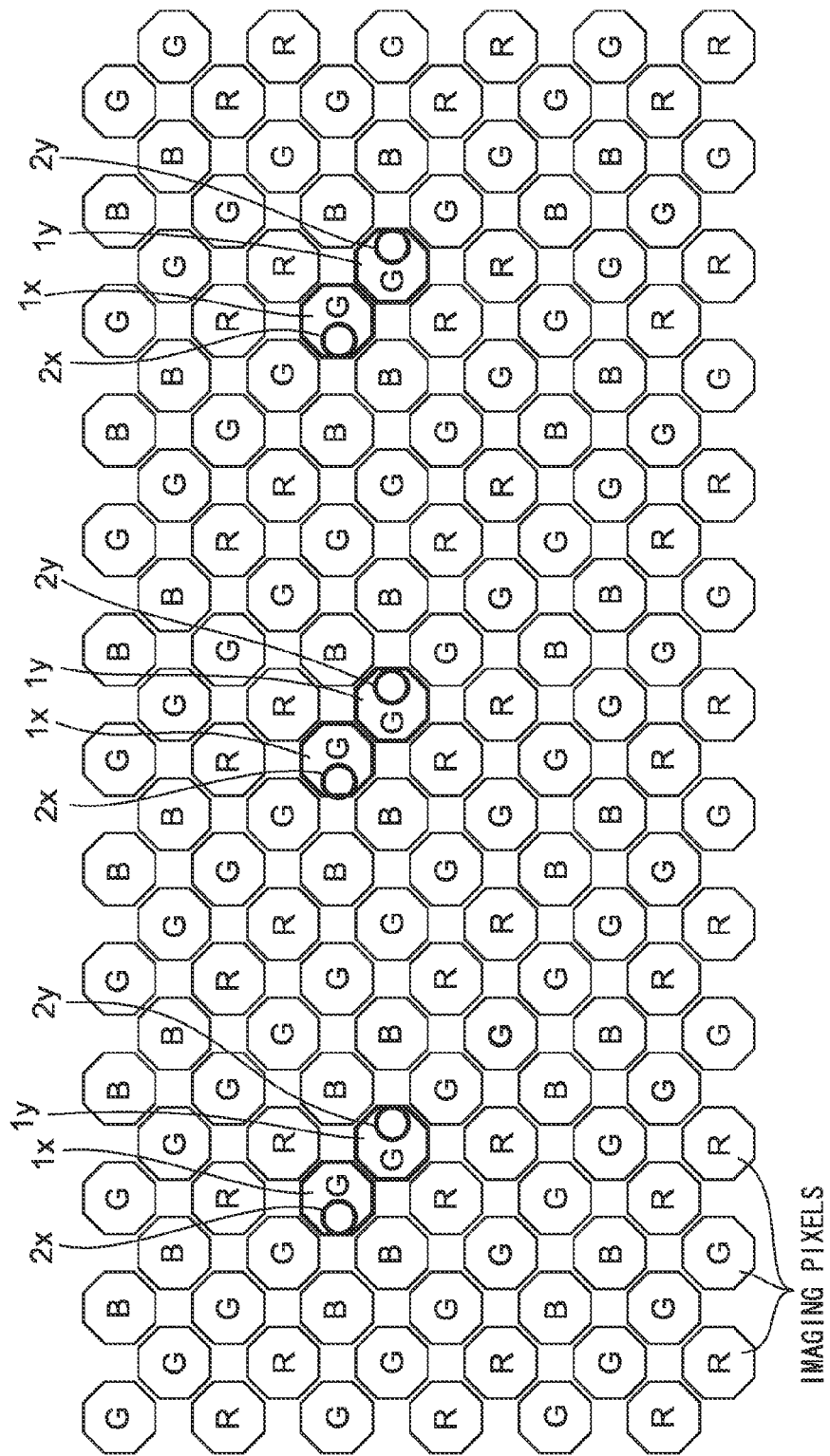
FIG. 3 is an enlarged schematic diagram illustrating a portion of a surface of a phase difference detection region.

FIG. 3 is an enlarged schematic diagram illustrating a portion of the surface of the phase difference detection region. As described above, numerous pixels are disposed in a honeycomb arrangement in the imaging region 70 of the CMOS 24. Similarly, in the phase difference detection region, pixels are disposed in a honeycomb arrangement, in which even-numbered pixel rows are shifted with respect to odd-numbered pixel rows by ½ the pixel pitch. Phase difference detection pixels 1x, 1y; and imaging pixels (pixels other than the phase difference detection pixels 1x, 1y that are not provided with a light-blocking film and are ordinary pixels used for imaging the subject) are disposed in the phase difference detection region. Moreover, although omitted from illustration, only the imaging pixels are disposed in the imaging region 70 other than in the phase difference detection region.

In the example illustrated in the drawings, each of the pixels is indicated by red (R), green (G) or blue (B). R, G, B represents the color of the color filter applied on each of the pixels. Moreover, the color filters for the odd-numbered row pixels are arrayed in a Bayer arrangement, and the color filters for the even-numbered row pixels are also arrayed in a Bayer arrangement. Accordingly, when taking the two phase difference detection pixels 1x, 1y adjacent to each other diagonally as a single group (pair), color filters of the same color are disposed on the two diagonally adjacent phase difference detection pixels 1x, 1y constituting the pair. Similarly, for the imaging pixels, when taking two diagonally adjacent imaging pixels as a pair, color filter of the same color are disposed for the two diagonally adjacent imaging pixels constituting the pair. As illustrated in the drawings, in the present exemplary embodiment, the pairs of phase difference detection pixels are provided at cyclical and discrete positions distributed within the phase difference detection region.

In the present exemplary embodiment, the phase difference detection pixels 1x, 1y are provided at the G filter pixels, which are the most common among R, G, B filter pixels. The pair of phase difference detection pixels 1x, 1y is disposed for every eight pixels in the horizontal direction (the x-direction), and for every eight pixels in the vertical direction (the y-direction), so that they are generally disposed in a checkerboard (uniform) pattern.

Moreover, light-blocking film openings 2x, 2y of the phase difference detection pixels 1x, 1y are formed smaller than the imaging pixels. The light-blocking film opening 2x of the pixel 1x provided eccentrically in the left direction, and the light-blocking film opening 2y of the pixel 1y provided eccentrically in the right direction (the phase difference detection direction).

Due to adopting such a configuration, a light beam that has passed through an opening eccentric to one side (in this case the left side) with respect to the main axis of the imaging lens is incident to the phase difference detection pixel 1x. Moreover, a light beam that has passed through an opening that is disposed on a line adjacent to the phase difference detection pixel 1x constituting the pair and that is eccentric to the other side (in this case the right side) with respect to the main axis of the imaging lens is incident to the phase difference detection pixel 1y. Thus the light beams that have passed through to the phase difference detection pixels 1x, 1y have beam axes that are shifted to the opposite sides from each other with respect to the main axis (note that in the vicinity of the main axis there may be some overlap between the light beams). As described later, since shifts in position and phase of an image detected at each of the phase difference detection pixels 1x, 1y arise in an out-of-focus state, focus control may be performed by detecting this shift amount (phase difference amount).

The phase difference detection pixels 1x, 1y can be used not only for phase difference detection for AF control but also be used for image formation of a subject.

Figure 4:
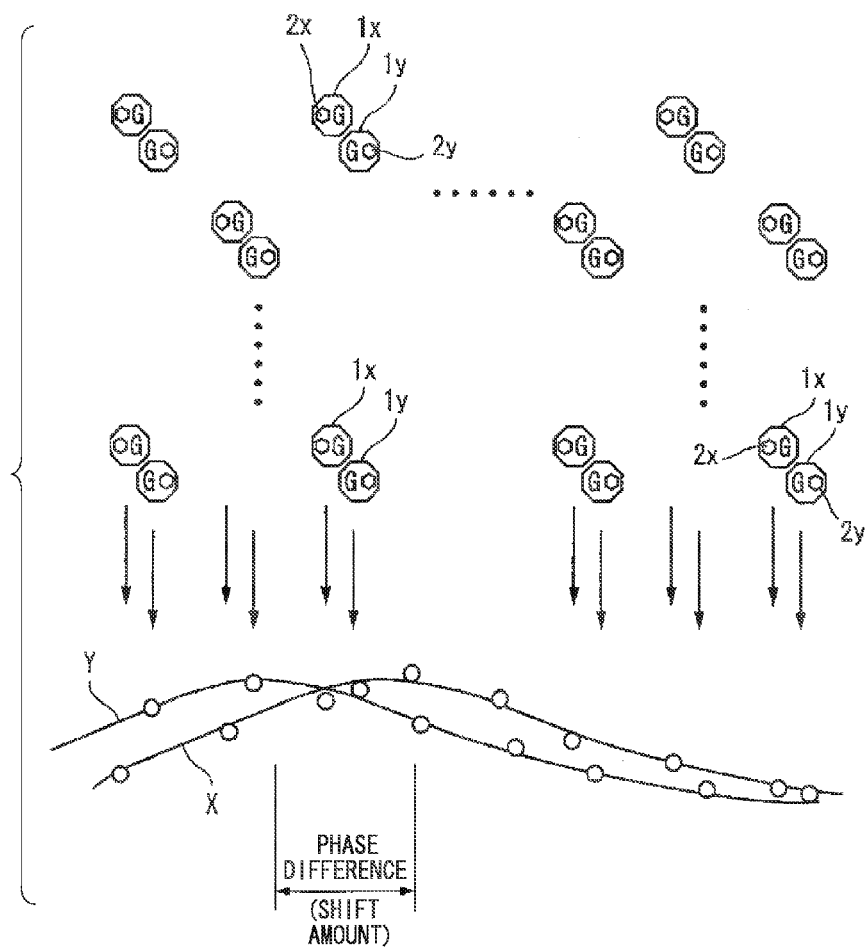
FIG. 4 is a diagram schematically illustrating only phase difference detection pixels extracted from FIG. 3.

FIG. 4 is a diagram schematically illustrating only the phase difference detection pixels 1x, 1y that have been extracted from FIG. 3. The curve X at the bottom of FIG. 4 is a graph plotting the detection signal intensity of the phase difference detection pixels 1x arrayed in an a single row, and curve Y is a graph plotting the detection signal intensity of the phase difference detection pixels 1y that are paired with these pixels 1x.

Since the phase difference detection pixels 1x, 1y that configure a single pair are adjacent pixels that are extremely close to each other, it is considered that they receive light from the same subject. Therefore, the curve X and the curve Y should be substantially the same shape as each other as long as there is no influence from distortion caused by the rolling shutter method, which is described later. The shift in the left-right direction (the phase difference detection direction) is a phase difference amount between an image viewed from the phase difference detection pixel 1x that is one of the pupil-divided pair and an image viewed from the other pixel 1y.

The horizontal shift amount (phase difference amount) can be derived by computing the correlation between the curve X and the curve Y, and the distance from the device to the subject can be computed from this phase difference. A known method (for example, the method disclosed in JP-A No. 2010-8443 or the method disclosed in JP-A No. 2010-91991) may be used to derive an evaluation value of a phase difference between the curve X and the curve Y. For example, the integral value of the absolute value of the difference between each of the points X (i) forming the curve X and each of the points Y (i+j) forming the curve Y may be taken as evaluation values and the j value that gives the maximum evaluation value may be taken as the phase difference.

Then the motor driver 34 may be controlled based on the distance from the device to the subject derived from the phase difference, and the focus adjustment motor of the optical unit 22 may be driven to control the position of the focus lens so as to focus on the subject.

Figure 5A:
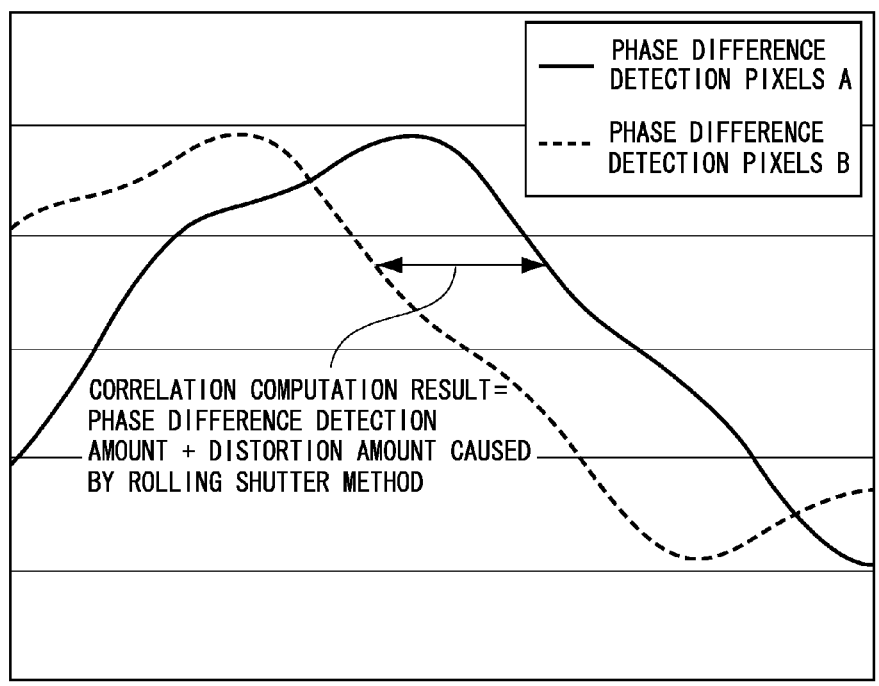
FIG. 5A is a diagram schematically illustrating that a shift amount derived by correlation computation on detection signals read from a pair of phase difference detection pixels contains not only a phase difference amount but also an error amount due to rolling distortion (distortion amount caused by the rolling shutter method)

However, the present exemplary embodiment uses a CMOS controlled by a rolling shutter method as the solid-state image pick-up device. Thus, in a case in which a correlation computation is performed on detection signals acquired from a phase difference detection pixel pair, configured from two diagonally adjacent phase difference detection pixels that are not read at the same time, distortion in the subject image being imaged arises if the subject has moved or changed during the different timings of read-out of the phase difference detection pixels, and an influence of distortion (distortion amount) caused by the rolling shutter method arises in the phase difference amount derived in the correlation computation (see also FIG. 5A).

Figure 5B:
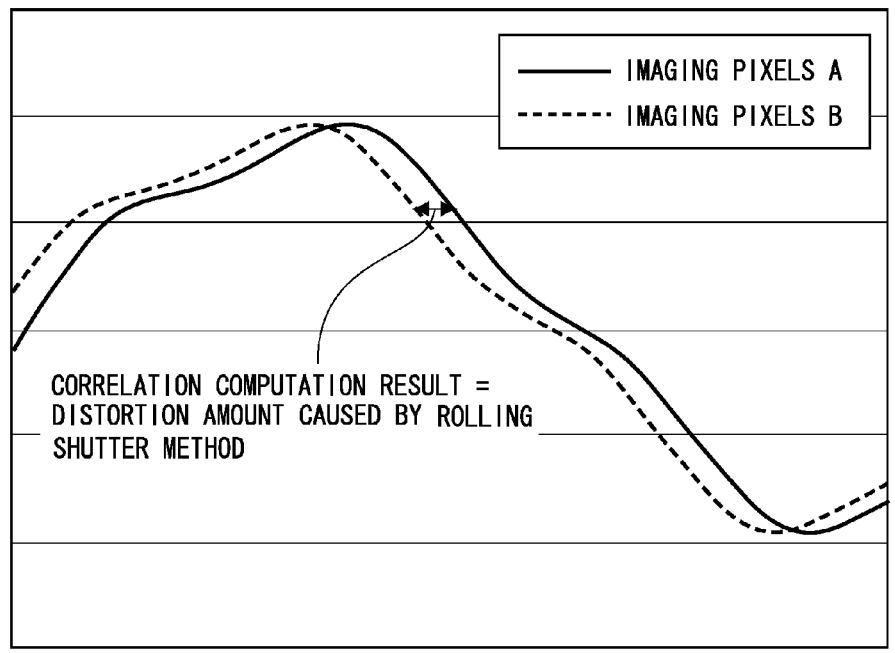
FIG. 5B is a schematic diagram illustrating that a distortion amount caused by the rolling shutter method can be computed by performing correlation computation on signals from imaging pixels.

In this regard, as illustrated in FIG. 5B, by taking, for example, two diagonally adjacent imaging pixels of the same color (indicated as imaging pixels A, B in FIG. 5B) as a group (pair), and performing correlation computation on the detection signals of this pair, only the distortion amount caused by the rolling shutter method can be computed, since there is no light-blocking film left-right eccentrically provided on each of the imaging pixels. In the present exemplary embodiment, AF control is performed by correcting the phase difference amounts derived from the phase difference detection pixels using the detection signal of the imaging pixels.

FIG. 6 is a flow chart illustrating a flow of AF control according to the present exemplary embodiment. During reading of detection signals from the phase difference detection pixels and the imaging pixels for performing AF control, the detection signals are read from the pixels in line units without discrimination between phase difference detection pixels and imaging pixels.

At step 100, correlation computation is performed on the detection signals (hereinafter also referred to as phase difference detection pixel signals) read from plural phase difference detection pixel pairs, and a phase difference amount is derived (the CPU 40 functions as a first correlation computation section).

Figure 7:
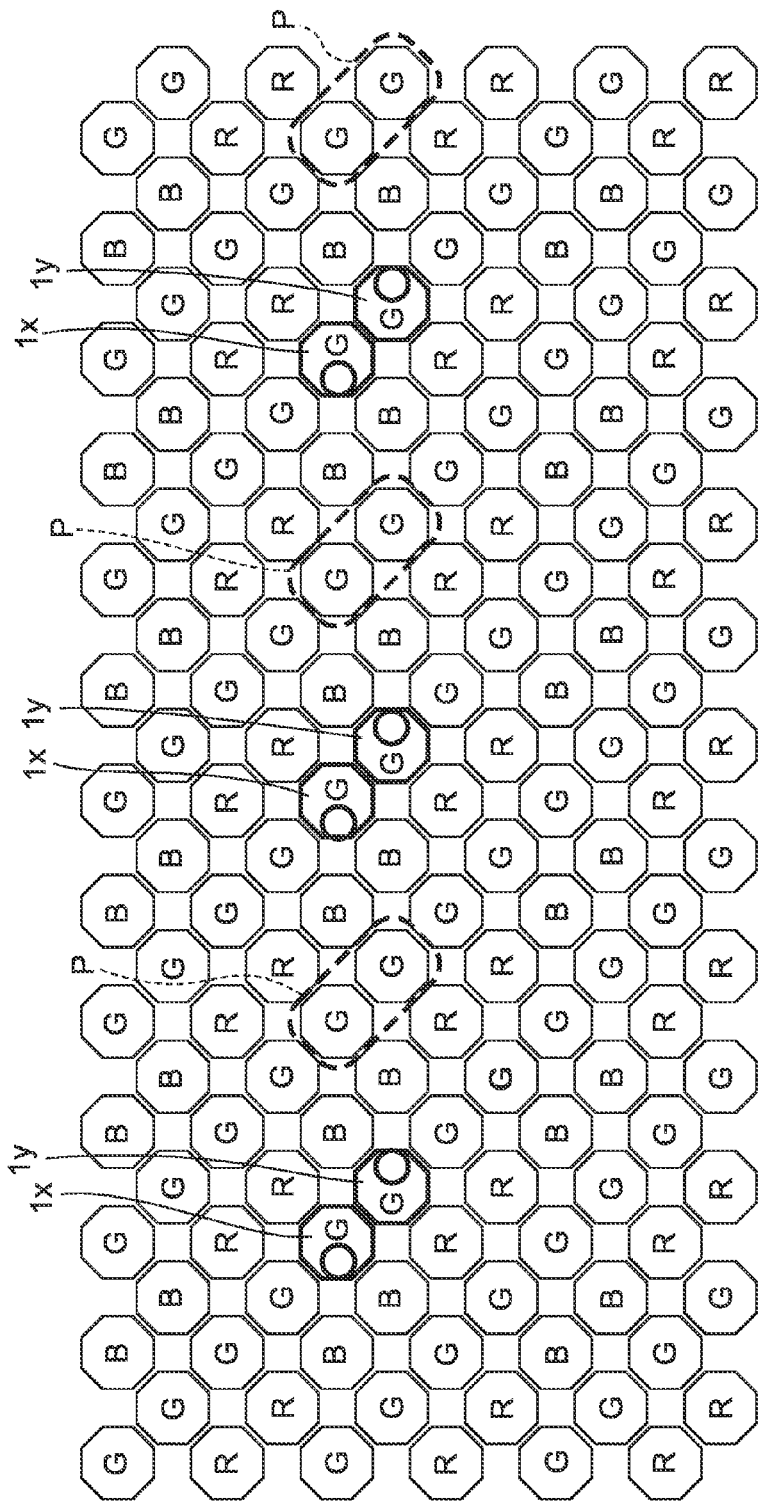
FIG. 7 is a diagram illustrating an example of imaging pixel pairs used for computing a distortion amount caused by the rolling shutter method.

At step 102, correlation computation is performed on the detection signals (hereinafter also referred to as imaging pixel signals) read from plural imaging pixel pairs, and the distortion amount caused by the rolling shutter method is derived (the CPU 40 functions as a second correlation computation section). In this case, as illustrated in FIG. 7, the distortion amount is derived by performing correlation computation on the detection signals read from the imaging pixel pairs P configured from the adjacent imaging pixels having filters of the same color as that of the phase difference detection pixels (in this case G filters) and disposed between phase difference detection pixels pairs that are disposed next to each other in the horizontal direction. Namely, in the present exemplary embodiment, looking at pairs formed with G filters, the imaging pixel pairs and the phase difference detection pixel pairs of G color are disposed alternately to each other in the horizontal direction. Consequently, in this case, the color G phase difference detection pixel pairs and the alternately disposed color G imaging pixel pairs are used to derive the distortion amount.

At step 104, the phase difference amount derived at step 100 is corrected by subtracting the distortion amount derived at step 102 from the phase difference amount detected at step 100 (the CPU 40 functions as a correction section)

At step 106, focus control is performed as described above based on the corrected phase difference amounts (the CPU 40 functions as a focusing section).

As described above, correlation computation results from the phase difference detection pixel signals are corrected with the correlation computation results of the normal pixel signals so as to perform AF control. Accordingly, the influence of distortion caused by the rolling shutter method is reduced, and AF control can be performed at high precision.

Figure 8:
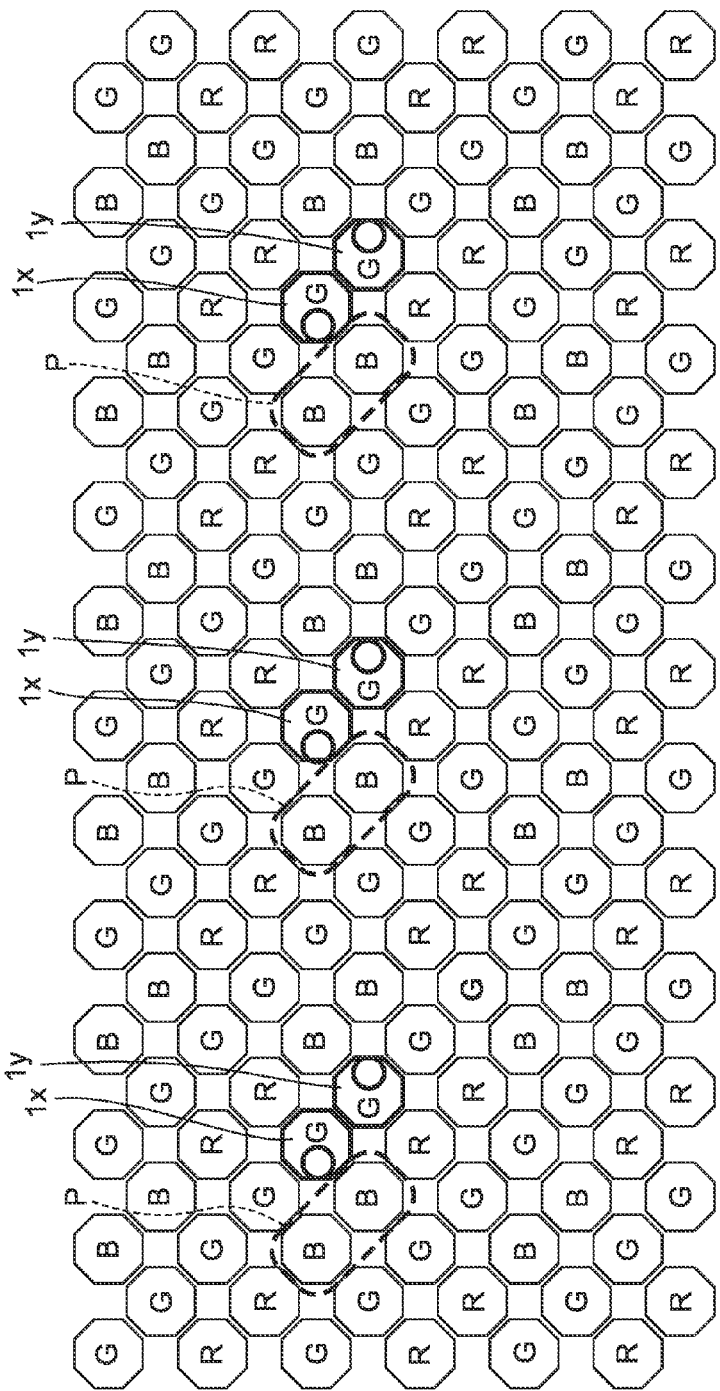
FIG. 8 is a diagram illustrating an example of imaging pixel pairs used for computing a distortion amount caused by the rolling shutter method.

Note that the imaging pixels for computing the distortion amount caused by the rolling shutter method are not limited to those illustrated in FIG. 7. For example, as illustrated in FIG. 8, the distortion amount may be derived by performing correlation computation on detection signals read from imaging pixel pairs P that are disposed between phase difference detection pixel pairs that are disposed next to each other in horizontal direction, and that have filters of a different color to those of the phase difference detection pixels. That is, the imaging pixel pairs P are configured from adjacent imaging pixels disposed on the same lines on which the phase difference detection pixels of the phase difference detection pixel pairs are disposed, and the imaging pixel pairs P have filters of a different color to those of the phase difference detection pixel pairs. In this way, even in cases in which there are no imaging pixel pairs having the same color filters between the phase difference detection pixels disposed next to each other in horizontal direction, it is possible to compute the phase difference amount at high precision by computing the distortion amount. The cases in which there are no imaging pixel pairs having the same color filters between the phase difference detection pixels disposed next to each other in horizontal direction include, for example, cases in which the phase difference detection pixels are disposed with an interval of four pixels in the horizontal direction (the x direction), or cases in which the placement of color filters on the pixels is different to that illustrated in FIG. 3.

Or, the distortion amount may be derived from detection signals read from imaging pixel pairs P configured by G imaging pixels that are disposed on different lines from the phase difference detection pixels 1x, 1y, and wherein the positions of the G imaging pixels from one end of the line are the same as the phase difference detection pixels 1x, 1y (that is, G imaging pixels that are disposed in a vertical direction of the phase difference detection pixel pairs).

Figure 9:
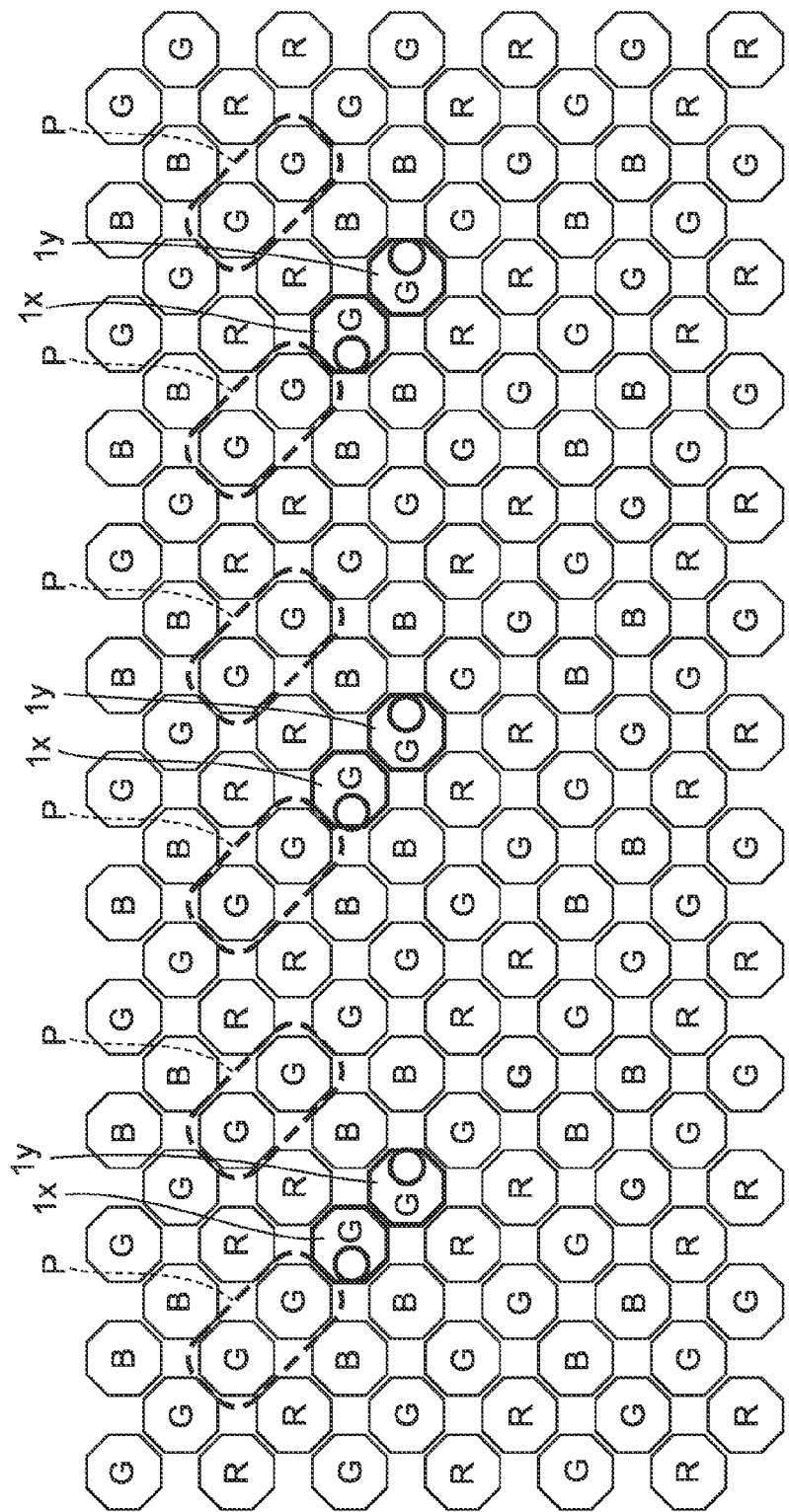
FIG. 9 is a diagram illustrating an example of imaging pixel pairs used for computing a distortion amount caused by the rolling shutter method.
Figure 10:
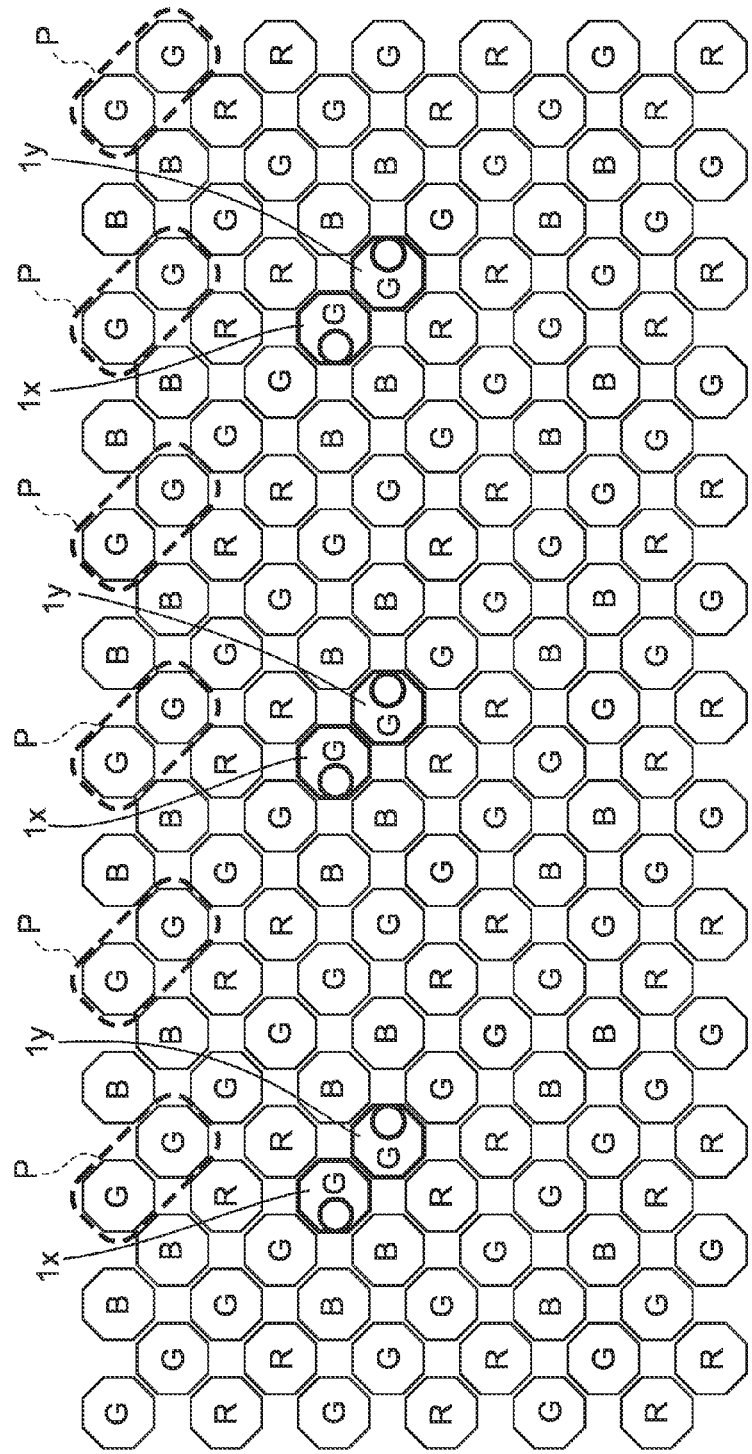
FIG. 10 is a diagram illustrating an example of imaging pixel pairs used for computing a distortion amount caused by the rolling shutter method.

Alternatively, as illustrated in FIG. 9, the distortion amount may be derived from detection signals read from imaging pixel pairs P configured by G imaging pixels adjacent to the phase difference detection pixels 1x, 1y, which are disposed on different lines from the phase difference detection pixels 1x, 1y, and wherein the positions of the G imaging pixels from one end of the line are different from the phase difference detection pixels 1x, 1y (that is, G imaging pixel pairs P that are disposed diagonally adjacent with respect to the phase difference detection pixel pairs). Or, as illustrated in FIG. 10, the distortion amount may be derived using G imaging pixel pairs P that are disposed in a vertical direction of the phase difference detection pixels, and G imaging pixel pairs P that are disposed in a diagonal direction thereof.

Namely, the respective imaging pixels constituting the imaging pixel pairs may be disposed in lines that are different from the lines in which the phase difference detection pixels of the phase difference detection pixel pairs are disposed. Accordingly, imaging pixel pairs used for computing the distortion amount may be increased by using imaging pixel pairs disposed on lines that are different from lines on which the phase difference detection pixel pairs are disposed (namely, imaging pixel pairs disposed in the vertical direction and/or the diagonal direction of phase difference detection pixel pairs). In this way, the density of imaging pixels for each horizontal line may be raised, and the computing precision of the distortion amount is improved.

In conventional AF control, phase difference detection is performed while an exposure control is performed to adjust the exposure amount in accordance with the sensitivity of the phase difference detection pixels. However, in cases in which AF control is performed as in the present exemplary embodiment, the exposure time may be controlled so as to adjust the exposure amount in accordance with the sensitivity of the imaging pixels (the CPU 40 functions as an exposure control section).

Figure 11:
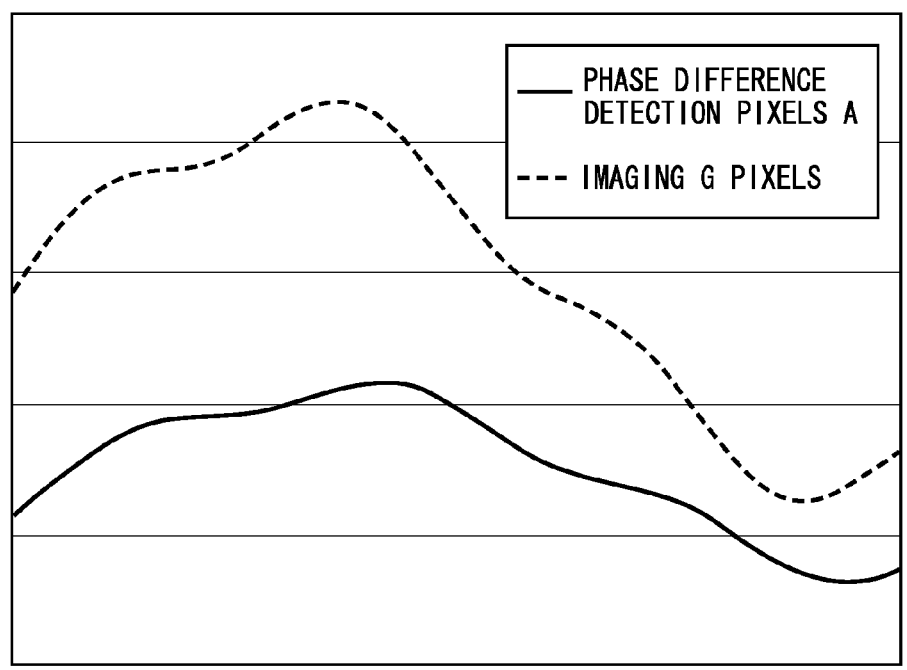
FIG. 11 is graph illustrating an example of signal intensities respectively read from phase difference detection pixels and G imaging pixels that are disposed diagonally-adjacent.

FIG. 11 is a graph illustrating an example of signal intensities respectively read from phase difference detection pixels and adjacent G imaging pixels that are disposed in a diagonal direction. In the phase difference detection pixels light-blocking film openings are formed smaller than those of the imaging pixels, and hence, as illustrated in FIG. 11, the sensitivity of the phase difference detection pixels is lower than the sensitivity of the imaging pixels. Therefore, in the AF control of the present exemplary embodiment, the exposure time is controlled such that the exposure amount for each of the pixels is given in accordance with the sensitivity of the imaging pixels, rather than in accordance with the sensitivity of the phase difference detection pixels. Accordingly, the computation precision with the imaging pixels may be improved.

Moreover, in cases in which the imaging pixels used for computing the distortion amount are not limited to the imaging pixels provided with color filters of the same color as those of the phase difference detection pixels, the detection signals read from each of the imaging pixels provided with a R filter, the imaging pixels provided with the G filters, and the imaging pixels provided with a B filter, which are disposed in the vicinity of the phase difference detection pixels, and the detection signals read from the phase difference detection pixels are mutually compared. Then, computation of the distortion amount may be performed by selecting and using pairs of imaging pixels of the color that have the closest sensitivity to the phase difference detection pixels (i.e., selecting imaging pixels provided with color filters having the nearest level of signal intensity (signal level) to the level of the detection signals of the phase difference detection pixels) (the CPU 40 functions as a selection section and a read control section).

Figure 12:
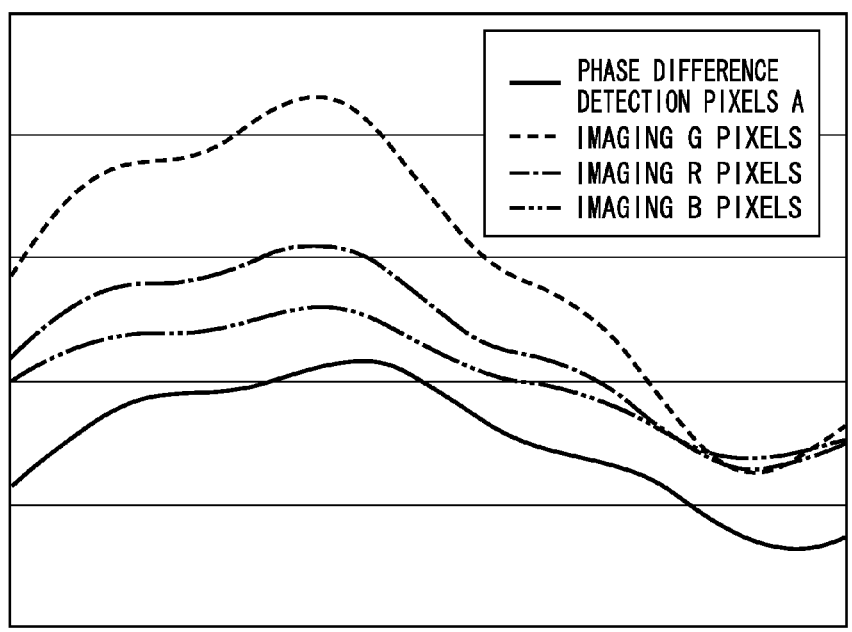
FIG. 12 is graph illustrating an example of levels of signal intensity of phase difference detection pixels A and levels of signal intensities respectively read from imaging pixels provided with an R color filter (normal R pixels), imaging pixels provided with a G color filter (normal G pixels) and imaging pixels provided with a B color filter (normal B pixels), which are disposed at the periphery of the phase difference detection pixels A.

FIG. 12 is a graph illustrating an example of signal levels of the phase difference detection pixels A, and signal levels read from each of imaging pixels provided with a R filter (normal R pixels), imaging pixels provided with G filters (normal G pixels), and imaging pixels provided with a B filter (normal B pixels), which are disposed in the vicinity of the phase difference detection pixels A. It can be seen in the example illustrated in FIG. 12 that among the normal R pixels, the normal G pixels, and the normal B pixels, the signal level of the normal B pixels is the closest to the signal level of the phase difference detection pixels A. Consequently, in this example, computation of distortion amount is performed using the pairs of normal B pixels.

Thus, sufficient signal intensity can be achieved for both the imaging pixels and the phase difference detection pixels, which may improve the precision of phase difference detection.

This method can be similarly applied to the cases illustrated in FIG. 9 and FIG. 10. That is, also in cases in which the distortion amount is computed using the imaging pixel pairs disposed in the vertical direction or the diagonal direction of the phase difference detection pixel pairs, the distortion amount may be computed using the imaging pixel pairs of the color having the nearest signal level to that of the phase difference detection pixel pairs.

Further, the colors of the subject image may be detected prior to AF control, the signal level of the phase difference detection pixels may be compared to the signal level of each of the colors R, G, B, and the color having a signal level that is closest to that of the phase difference detection pixels may be selected, and data thereof may be stored in advance. Then, during AF control, detection signals may be read from the imaging pixel pairs of the color indicated by the stored data and from the phase difference detection pixel pairs, and the read signals may be used in the phase difference detection as described above.

For example, since white balance correction includes a process of detecting the signals of each of the colors R, G, B, white balance correction may be performed prior to AF control in order to check the signal intensities of each of the colors, and the color with the nearest signal intensity to the phase difference detection pixels may be selected and stored in advance for use during AF control.

In this way, since there is no need to read the detection signal from all the colors of imaging pixels at the AF control stage, the time required for reading detection signals can be reduced, and the computation of the distortion amount may be performed at high precision.

Embodiments are not limited to the present exemplary embodiment in which rolling correction is always performed. For example, a switching section that switches between a first mode in which rolling correction is performed in AF control and a second mode in which rolling correction is not performed may be provided, and AF control may be performed according to the mode switched by a user using the switching section.

Second Exemplary Embodiment

The first exemplary embodiment has given an example in which distortion amount computation and correction is always performed during AF control. However, in cases in which it is expected that distortion caused by the rolling shutter method has relatively small influence, computing process of the distortion amount and correction process may be omitted. Detailed explanation thereof follows.

Since the configuration of the digital camera 10 of the present exemplary embodiment is similar to that of the first exemplary embodiment, explanation thereof is omitted.

Figure 13:
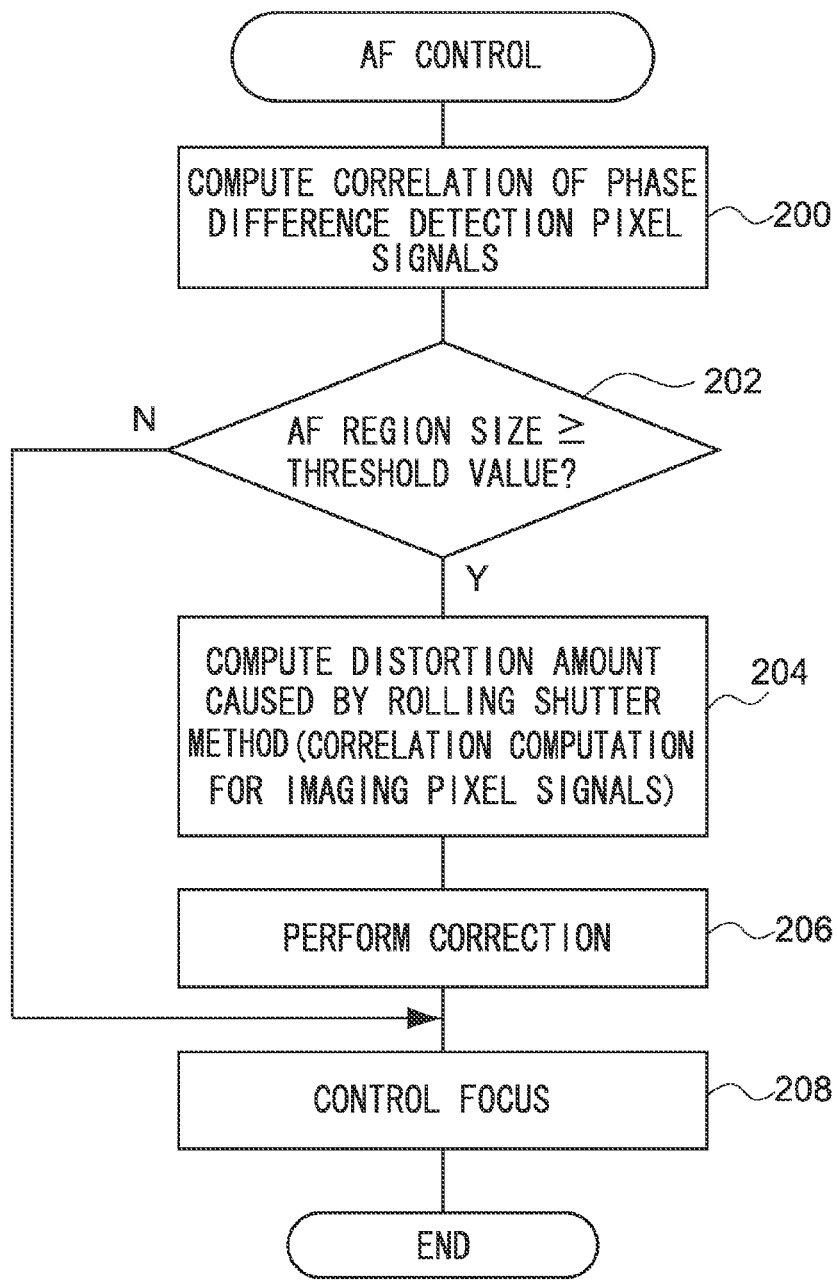
FIG. 13 is a flow chart illustrating an example of flow of AF control processing according to a second exemplary embodiment.

FIG. 13 is a flow chart illustrating an example flow of AF control processing according to the present exemplary embodiment.

At step 200, correlation computation is performed on the phase difference detection pixel signals as explained in the first exemplary embodiment, and the phase difference amount is derived.

At step 202, determination is made as to whether or not the size of an AF region is equal to or greater than a predetermined threshold value. The AF region is a region for focus matching, and there are cases in which the digital camera 10 is configured to allow a user to set a desired position or size of the AF region, or cases in which the size of the AF region is set according to the imaging mode. In the present exemplary embodiment, data indicating the size of the AF region set in the digital camera 10 is acquired, and is compared with a predetermined threshold value (the CPU functions as a determination section).

If a positive determination has been made at step 202, then at step 204 the correlation computation on imaging pixel signals is performed as explained in the first exemplary embodiment, and the distortion amount is determined. At step 206, the phase difference amount derived at step 200 is corrected by subtracting the distortion amount derived at step 204 from the phase difference amount derived at step 200. At step 208, focus control is performed based on the corrected phase difference amount.

However, if a negative determination has been made at step 202, steps 204 and 206 are skipped, and the processing proceeds to step 208. In such cases, focus control is performed at step 208 by directly using the phase difference amount derived at step 200 (i.e., using the phase difference amount that is not corrected by a distortion amount).

In cases in which the AF region is not relatively large, the number of phase difference detection pixels for detection signal reading is small and the influence of distortion caused by the rolling shutter method is expected to be small. Thus, in the present exemplary embodiment, in cases in which the size of the AF region is less than the threshold value, AF control is performed without performing the distortion amount computation process and the correction process. Thereby, the time required for AF control can be reduced.

Figure 14:
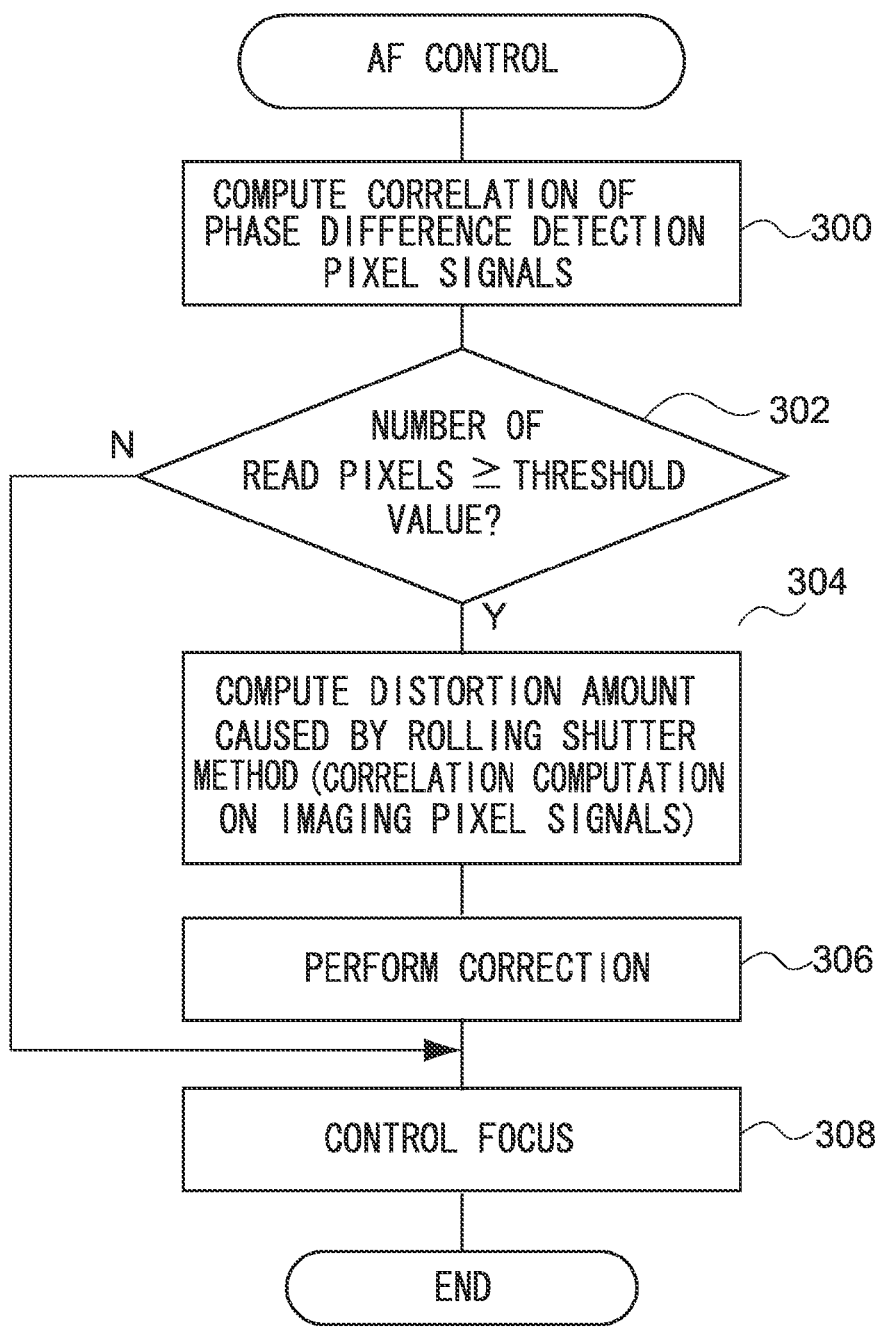
FIG. 14 is a flow chart illustrating another example of flow of AF control processing according to the second exemplary embodiment.

FIG. 14 is a flow chart illustrating another example of a flow of AF control processing.

In step 300, correlation computation on the phase difference detection pixel signals is performed as explained in the first exemplary embodiment and the phase difference amount is then derived.

In step 302, determination is made as to whether or not the number of read pixels (i.e., the number of phase difference detection pixels from which detection signals are read) is equal to or greater than a predetermined threshold value. If a positive determination has been made at step 302, at step 304 correlation computation on the imaging pixel signals is performed and the distortion amount is derived as explained in the first exemplary embodiment. At step 306, the phase difference amount derived at step 300 is corrected by subtracting the distortion amount derived at step 304 from the phase difference amount derived at step 300. Then focus control is performed at step 308 based on the corrected phase difference amount.

However, if a negative determination has been made at step 302, steps 304 and 306 are skipped, and the processing proceeds to step 308. In such cases, focus control is performed at step 308 by directly using the phase difference amount derived at step 300 (i.e., using the phase difference amount that is not corrected by a distortion amount).

In cases in which the number of phase difference detection pixels for reading detection signals (namely, the number of phase difference detection pixel used at step 300 to compute the phase difference amount) is small, the influence of distortion caused by the rolling shutter method is expected to be small. Thus, in the present example, in cases in which the number of phase difference detection pixels for reading detection signals is less than the threshold value, AF control is performed without performing the distortion amount computation process and the correction process. Thereby, the time required for AF control can be reduced.

The threshold values used in the embodiments illustrated in FIG. 13 and FIG. 14 may be changed according to the image angle. Specifically, for example, in a case in which the digital camera 10 is configured to allow selection of a wide angle mode, a normal mode, or a telephoto mode, a threshold value may be set in advance for each of the modes, and the threshold value described above may be changed according to the imaging mode that has been set when AF control is performed. Since the influence of the distortion caused by the rolling shutter method is expected to be greater as the image angle is set toward the telephoto side, the threshold value may be set smaller at the telephoto side than the wide angle side.

Figure 15:
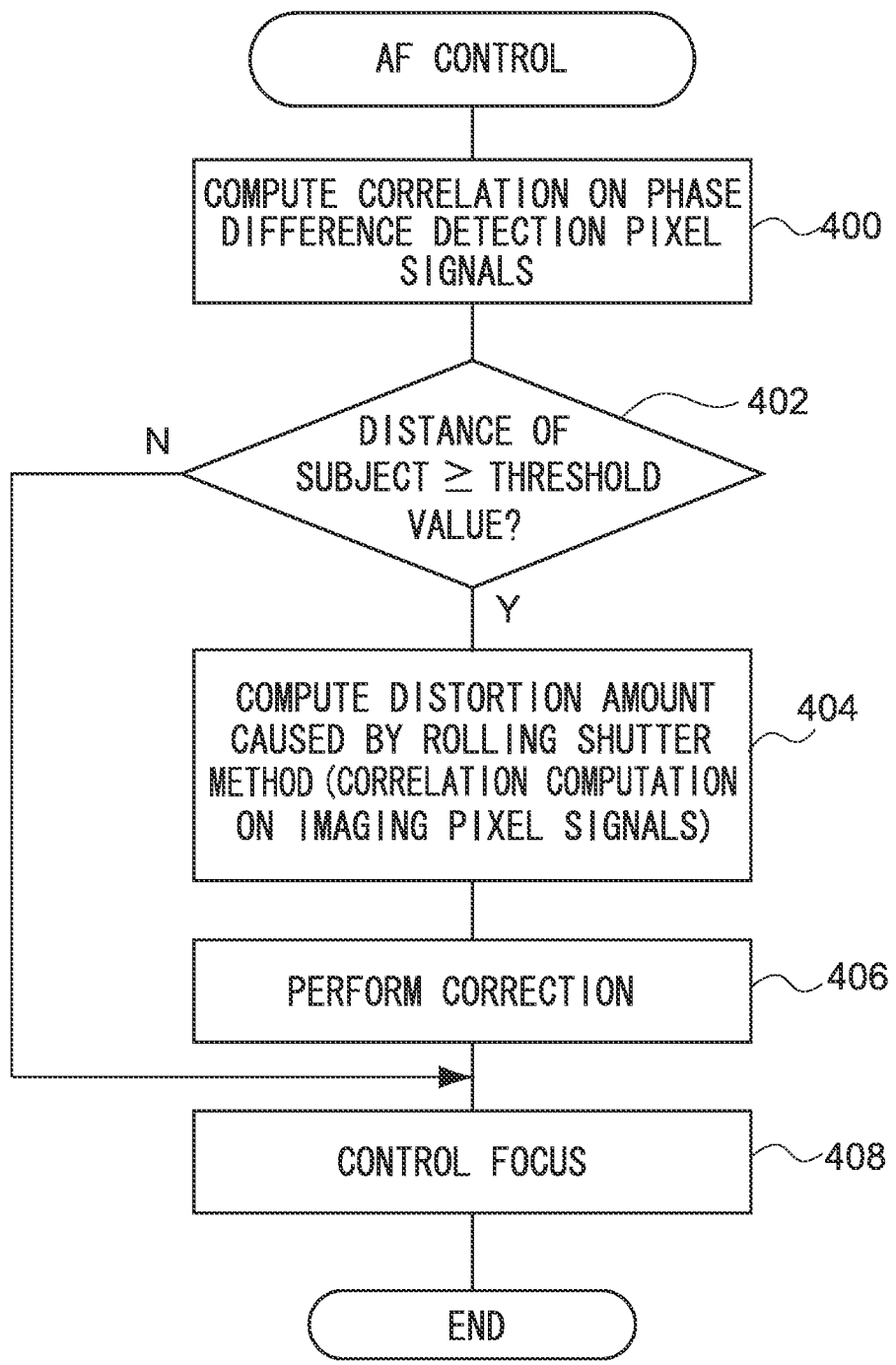
FIG. 15 is a flow chart illustrating another example of flow of AF control processing according to the second exemplary embodiment.

FIG. 15 is a flow chart illustrating another example of AF control processing.

At step 400, correlation computation on the phase difference detection pixel signals is performed as explained in the first exemplary embodiment, and the phase difference amount is derived.

At step 402, determination is made as to whether or not a distance to the subject is equal to or greater than a predetermined threshold value. In this case, the distance to the subject that is provisionally derived from the phase difference derived at step 400 is compared with the predetermined threshold value. The threshold value for comparison may be changed according to the size of the AF region or the number of read pixels. If a positive determination has been made at step 402, correlation computation on the imaging pixel signals is performed and the distortion amount is derived at step 404 as explained in the first exemplary embodiment. At step 406, the phase difference amount derived at step 400 is corrected by subtracting the distortion amount derived at step 404 from the phase difference amount derived at step 400. Then, at step 408, focus control is performed based on the corrected phase difference amount.

However, if a negative determination has been made at step 402, steps 404 and 406 are skipped, and the processing proceeds to step 408. In such cases, at step 408 focus control is performed directly using the phase difference amount derived at step 400 (i.e., using the phase difference amount that is not corrected by a distortion amount).

The degree of influence caused by the rolling shutter method varies depending on the movement of a subject within the image capture angle. In particular, the influence of distortion caused by the rolling shutter method is expected to be larger as the distance to the subject is longer. Thus, in the present exemplary, of the distortion amount computation process and the correction process are performed in cases in which the distance to the subject is equal to or longer than the threshold value, and are not performed in cases which the distance to the subject is shorter than the threshold value.

FIG. 16 is a flow chart illustrating another example of flow of AF control processing.

At step 500, correlation computation on the phase difference detection pixel signals is performed as explained in the first exemplary embodiment and the phase difference amount is then derived.

In step 502, detection of a moving body in the image angle is performed. For example, movement vectors between past image data stored in the memory 48 and current image data may be computed using a known method, and the detection may be performed based on the magnitude of the movement vector.

At step 504, determination is made as to whether or not there is a moving body present in the image angle based on the detection result. If a positive determination has been made at step 504, at step 506, the distortion amount is derived by performing correlation computation on the imaging pixel signals as explained in the first exemplary embodiment. At step 508, the phase difference amount derived at step 500 is corrected by subtracting the distortion amount derived at step 506 from the phase difference amount derived at step 500. Then, at step 510, focus control is performed based on the corrected phase difference amount.

If a negative determination has been made at step 504, step 506 and step 508 are skipped, and the processing proceeds to step 510. In such cases, focus control is performed at step 510 directly using the phase difference amount derived at step 500 (i.e., using the phase difference amount that is not corrected by a distortion amount).

The distortion caused by the rolling shutter method occurs in cases in which a moving body is present in the image capture angle. Thus, in the present example, a moving body is detected, and the distortion amount computation process and the correction process are performed only in cases in which a moving body is present, and are not performed in cases in which a moving body is not present.

FIG. 17 is a flow chart illustrating another example of flow of AF control processing.

At step 600, correlation computation on the phase difference detection pixel signals is performed as explained in the first exemplary embodiment and the phase difference amount is then derived.

In step 602, detection for a moving body in the AF region is performed. For example, movement vectors between past image data stored in the memory 48 and current image data may be computed using a known method, and the detection of moving body may be performed based on the magnitude of the movement vector.

At step 604, determination is made as to whether or not there is moving body present in the AF region based on the detection result. If a positive determination has been made at step 602, at step 606, the distortion amount is derived by performing correlation computation on the imaging pixel signals as explained in the first exemplary embodiment. At step 608, the phase difference amount derived at step 600 is corrected by subtracting the distortion amount derived at step 606 from the phase difference amount derived at step 600. Then, at step 610, focus control is performed based on the corrected phase difference amount.

However, if a negative determination has been made at step 604, steps 606 and 608 are skipped, and the processing proceeds to step 610. In such cases, at step 610, focus control is performed directly using the phase difference amount derived at step 600 (i.e., using the phase difference amount that is not corrected by a distortion amount).

The distortion caused by the rolling shutter method occurs in cases in which a moving body is present in the image capture angle. Thus, in the present example, a moving body is detected in particular in the AF region, and the distortion amount computation process and the correction process are performed only in cases in which a moving body is present in the AF region, and are not performed in cases in which a moving body is not present.

As explained above, in the present exemplary embodiment, in cases in which the influence of distortion caused by the rolling shutter method is expected to be small, the distortion amount computation and correction are not performed, and are performed in other cases. Consequently, unnecessary time can be saved during AF control, while preventing the influence of distortion caused by the rolling shutter method.

Embodiments are not limited to the present exemplary embodiment in which a determination of performing the distortion amount computation and correction is made according to one of the size of the AF region, the number of read pixels, the distance to the subject, movement of the subject in the image capture angle, or movement of the subject in the AF region. For example, the determination of performing the distortion amount computation and correction may be made according to at least one of the size of the AF region, the number of read pixels, the distance to the subject, movement of the subject in the image capture angle, and/or movement of the subject in the AF region.

The digital camera 10 may include a switching section that switches between a first mode in which rolling correction is always performed as in the first exemplary embodiment, and a second mode in which rolling correction is not performed if it is expected that the influence from distortion caused by the rolling shutter method is small as in the second exemplary embodiment. In such cases, AF control may be performed according to the mode switched to by a user using the switching section.

Further, the phase difference detection pixels 1$x$, 1$y$ are not limited to the examples illustrated in the respective exemplary embodiments described above. For example, the phase difference detection pixel 1$x$ may be configured such that light is blocked at the right half and is open at the left half, and the phase difference detection pixel 1$y$ may be configured such that light is blocked at the left half and is open at the right half. Using such configured phase difference detection pixels, similarly to the embodiments described above, a light beam that has passed through one side (in this case the left side) with respect to the main axis of the imaging lens is incident to the phase difference detection pixel 1$x$, and a light beam that has passed through the other side (the right side) with respect to the main axis of the imaging lens is incident to the phase difference detection pixel 1$y$.

Further, embodiments are not limited to the configurations of the first and second exemplary embodiment in which the phase difference detection pixels constituting the phase difference detection pixel pairs are adjacent pixels. The phase difference detection pixels constituting the phase difference detection pixel pairs may not be adjacent to each other, and one or more pixels may be disposed between the pixels constituting the pairs. Embodiments are also not limited to the configuration in which the imaging pixels constituting the imaging pixel pairs are adjacent pixels. The imaging pixels constituting the imaging pixel pairs may not be adjacent to each other, and one or more pixels may be disposed between the pixels constituting the pairs.

Embodiments are not limited to the cases in the first exemplary embodiment and the second exemplary embodiment, which describe applications a digital camera. For example, embodiments are possible in which application is made to other devices that include imaging functions, such as mobile phones, PDAs and the like. Similar effects to those of the exemplary embodiments described above can also be exhibited in such cases.

The flow of processing in each of the processing programs explained in the exemplary embodiments are merely examples, and modifications within a range not departing from the spirit of the present invention such as changing the processing sequence of each step, changing the contents of the processing, eliminating unnecessary steps for actual implementation, or adding new steps are obviously possible.

What is claimed is:

1. An imaging device comprising:
an image pick-up device comprising
  a plurality of phase difference detection pixel pairs, each formed from a first phase difference detection pixel having an opening eccentrically formed on one side with respect to a main axis of an imaging lens and a second phase difference detection pixel having an opening eccentrically formed on the other side with respect to the main axis, and
  a plurality of imaging pixel pairs including a plurality of imaging pixels;
a reading section that performs read-out with respect to the image pick-up device by reading signals from the imaging pixels and the phase difference detection pixels arrayed in the image pick-up device using a rolling shutter method;
a first correlation computation section that performs correlation computation on the signals that have been read from the phase difference detection pixel pairs;
a second correlation computation section that performs correlation computation on the signals that have been read from the imaging pixel pairs;
a correction section that corrects a correlation computation result from the first correlation computation section using a correlation computation result from the second correlation computation section; and
a focusing section that performs focus control using the corrected correlation computation result.

2. The imaging device of claim 1, wherein the second correlation computation section performs correlation computation on signals read from the plurality of imaging pixel pairs, each of which is formed from:

an imaging pixel disposed on a line on which the first phase difference detection pixel of one of the plurality of phase difference detection pixel pairs is disposed, and
an imaging pixel disposed on a line on which the second phase difference detection pixel of the one of the plurality of phase difference detection pixel pairs is disposed.

3. The imaging device of claim 1, wherein the second correlation computation section performs correlation computation on signals read from the plurality of imaging pixel pairs, each of which are formed from imaging pixels that are disposed on lines that are different from the lines on which the phase difference detection pixels of the plurality of phase difference detection pixel pairs are disposed.

4. The imaging device of claim 1, wherein the second correlation computation section performs correlation computation on signals read from the plurality of imaging pixel pairs provided with color filters of a same color as a color of color filters provided at the plurality of phase difference detection pixel pairs.

5. The imaging device of claim 1, wherein the second correlation computation section performs correlation computation on signals read from the plurality of imaging pixel pairs, which include an imaging pixel pair provided with color filters of a different color from a color of color filters provided at the plurality of phase difference detection pixel pairs.

6. The imaging device of claim 1, wherein the plurality of imaging pixel pairs comprise one or more imaging pixel pairs provided with R color filters, one or more imaging pixel pairs provided with G color filters, and one or more imaging pixel pairs provided with B color filters, and
the second correlation computation section performs correlation computation on signals that are read from one or more imaging pixel pairs of the plurality of imaging pixel pairs which are formed from imaging pixels provided with color filters of a color having a signal level closest to a signal level of the phase difference detection pixels forming the plurality of phase difference detection pixel pairs.

7. The imaging device of claim 1, further comprising:
a selection section that, prior to the correlation computation performed by the second correlation computation section, selects from the plurality of imaging pixel pairs, which comprise one or more imaging pixel pairs provided with R color filters, one or more imaging pixel pairs provided with G color filters and one or more imaging pixel pairs provided with B color filters, one or more imaging pixel pairs formed from imaging pixels provided with color filters of a color having a signal level closest to a signal level of the phase difference detection pixels forming the plurality of phase difference detection pixel pairs; and
a control section that controls the reading section such that signals are respectively read from the plurality of phase difference detection pixel pairs and the one or more imaging pixel pairs selected by the selection section,
wherein the second correlation computation section performs the correlation computation on the signals read under control of the control section.

8. The imaging device of claim 1, further comprising an exposure control section that controls an exposure time of the image pick-up device such that an exposure amount corresponds to the sensitivity of the imaging pixels.

9. The imaging device of claim 1, further comprising:
a determination section that determines whether or not correction is to be performed by the correction section based on at least one of: a size of a focal region for focus matching, a number of the phase difference detection pixels from which signals used in correlation computation by the first correlation computation section are read out, movement of a subject within an image capture angle, or movement of a subject within the focal region,
wherein, if the determination section determines that correction is not to be performed by the correction section, the focusing section prevents execution of the correction by the correction section and performs focus control using the correlation computation result from the first correlation computation section without correction.

10. A focusing control method for an imaging device comprising an image pick-up device comprising a plurality of phase difference detection pixel pairs each formed from a first phase difference detection pixel having an opening eccentrically formed on one side with respect to a main axis of an imaging lens and a second phase difference detection pixel having an opening eccentrically formed on the other side with respect to the main axis, and a plurality of imaging pixel pairs including a plurality of imaging pixels, the focusing control method comprising:
performing reading-out to the image pick-up device by reading signals from the imaging pixels and the phase difference detection pixels arrayed in the image pick-up device using a rolling shutter method;
performing a first correlation computation on the signals that have been read from the plurality of phase difference detection pixel pairs;
performing a second correlation computation on the signals that have been read from the plurality of imaging pixel pairs;
correcting a result of the first correlation computation using a result of the second correlation computation; and
performing focus control using the corrected result of the correlation computations.

11. The focusing control method of claim 10, wherein the second correlation computation comprises performing correlation computation on signals read from the plurality of imaging pixel pairs, each of which is formed from:
an imaging pixel disposed on a line on which the first phase difference detection pixel of one of the plurality of phase difference detection pixel pairs is disposed, and
an imaging pixel disposed on a line on which the second phase difference detection pixel of the one of the plurality of phase difference detection pixel pairs is disposed.

12. The focusing control method of claim 10, wherein the second correlation computation comprises performing correlation computation on signals read from the plurality of imaging pixel pairs each formed from imaging pixels that are disposed on lines that are different from lines on which the phase difference detection pixels of the plurality of phase difference detection pixel pairs are disposed.

13. The focusing control method of claim 10, wherein the second correlation computation comprises performing correlation computation on signals read from the plurality of imaging pixel pairs, which are provided with color filters of a same color as a color of color filters provided at the plurality of phase difference detection pixel pairs.

14. The focusing control method of claim 10, wherein the second correlation computation comprises performing correlation computation on signals read from the plurality of imaging pixel pairs, which include an imaging pixel pair provided with color filters of a different color from a color of color filters provided at the plurality of phase difference detection pixel pairs.

15. The focusing control method of claim 10, wherein the plurality of imaging pixel pairs comprise one or more imaging pixel pairs provided with R color filters, one or more imaging pixel pairs provided with G color filters, and one or more imaging pixel pairs provided with B color filters, and the second correlation computation comprises performing correlation computation on signals that are read from one or more imaging pixel pairs of the plurality of imaging pixel pairs which are configured from imaging pixels provided with color filters of a color having a signal level closest to a signal level of the phase difference detection pixels forming the plurality of phase difference detection pixel pairs.

16. The focusing control method of claim 10, further comprising:

prior to the second correlation computation, selecting from the plurality of imaging pixel pairs, which comprise one or more imaging pixel pairs provided with R color filters, one or more imaging pixel pairs provided with G color filters and one or more imaging pixel pairs provided with B color filters, one or more imaging pixel pairs formed from imaging pixels provided with color filters of a color having a signal level closest to a signal level of the phase difference detection pixels forming the plurality of phase difference detection pixel pairs; and controlling the reading such that signals are read from the plurality of phase difference detection pixel pairs and the selected one or more imaging pixel pairs, wherein the second correlation computation comprises performing correlation computation on the read signals.

17. The focusing control method of claim 10, further comprising controlling an exposure time of the image pick-up device such that an exposure amount corresponds to the sensitivity of the imaging pixels.

18. The focusing control method of claim 10, further comprising:

determining whether or not correction is to be performed based on at least one of: a size of a focal region for focus matching, a number of the phase difference detection pixels from which signals used in the first correlation computation are read out, movement of a subject within an image capture angle, or movement of a subject within the focal region; and if it has determined that correction is not to be performed, preventing execution of correction and performing focus control using the result of the first correlation computation without correction.

\* \* \* \* \*